US009161166B2

(12) United States Patent
Johansson et al.

(10) Patent No.: US 9,161,166 B2
(45) Date of Patent: Oct. 13, 2015

(54) METHOD AND APPARATUS FOR INTERCONNECTED DEVICES

(75) Inventors: Karl-Anders Reinhold Johansson, Staffanstorp (SE); Dan Zacharias Gärdenfors, Malmo (SE); Emil Alexander Wasberger, Landskrona (SE); Michael Erik Winberg, Malmo (SE); Mathias Lewin, Rydebäck (SE)

(73) Assignee: BlackBerry Limited, Waterloo, Ontario (CA)

( * ) Notice: Subject to any disclaimer, the term of this patent is extended or adjusted under 35 U.S.C. 154(b) by 693 days.

(21) Appl. No.: 13/404,906

(22) Filed: Feb. 24, 2012

(65) Prior Publication Data
US 2013/0226444 A1   Aug. 29, 2013

(51) Int. Cl.
*G06F 3/0488* (2013.01)
*H04W 4/02* (2009.01)
*H04W 4/00* (2009.01)

(52) U.S. Cl.
CPC ............. *H04W 4/023* (2013.01); *G06F 3/0488* (2013.01); *H04W 4/008* (2013.01)

(58) Field of Classification Search
CPC ....... H04W 4/023; H04W 4/008; H04W 4/02; H04W 4/021; H04W 4/025; G06F 3/0488; G06F 3/0425
USPC ......... 345/173; 455/456.1, 456.3, 456.6, 457; 701/300, 301, 302
See application file for complete search history.

(56) References Cited

U.S. PATENT DOCUMENTS

| 5,317,321 | A | * | 5/1994 | Sass | ............................... 342/176 |
| 5,511,148 | A | * | 4/1996 | Wellner | ........................ 358/1.6 |
| 5,732,227 | A | * | 3/1998 | Kuzunuki et al. | ............. 715/775 |
| 8,447,070 | B1 | * | 5/2013 | Bozarth et al. | ................ 382/103 |
| 2002/0126161 | A1 | * | 9/2002 | Kuzunuki et al. | ............. 345/863 |
| 2002/0183052 | A1 | * | 12/2002 | Tachikawa | .................... 455/422 |
| 2003/0045301 | A1 | * | 3/2003 | Wollrab | ........................ 455/456 |
| 2009/0244015 | A1 | | 10/2009 | Sengupta et al. | |
| 2010/0295773 | A1 | | 11/2010 | Alameh et al. | |
| 2011/0065459 | A1 | | 3/2011 | Cheng | |
| 2011/0081923 | A1 | | 4/2011 | Forutanpour et al. | |
| 2011/0154014 | A1 | | 6/2011 | Thorn | |

OTHER PUBLICATIONS

European Patent Office, Extended Search Report issued in EP Application No. 12157013.9, dated Aug. 6, 2012, 6 pages.
Canadian Intellectual Property Office, "Office Action," issued in connection with application No. CA 2,806,804, on Jul. 22, 2014, 3 pages.

* cited by examiner

*Primary Examiner* — Stephen Holwerda
(74) *Attorney, Agent, or Firm* — Fish & Richardson P.C.

(57) ABSTRACT

A computer implemented method includes, at an electronic device having an input interface and a display, receiving information relating to a current relative location of at least one other electronic device, displaying on the display a representation of the at least one other electronic device and its relative location, and receiving at the input interface user input associated with the displayed representation of the at least one other electronic device for communicating with the at least one other electronic device. The electronic device has up-to-date knowledge of the relative position of the at least one other device and displays this visually. Information may be sent to the at least one other electronic device in response to receiving the user input associated with the displayed representation of the at least one other electronic device.

13 Claims, 29 Drawing Sheets

Meeting view (initial, passive)

Viewing own content list

Previewing own content

Closing a preview

Before sharing content

Initiating sharing (finger down)

Targeting device (drag above)

Sharing content (dropping it)

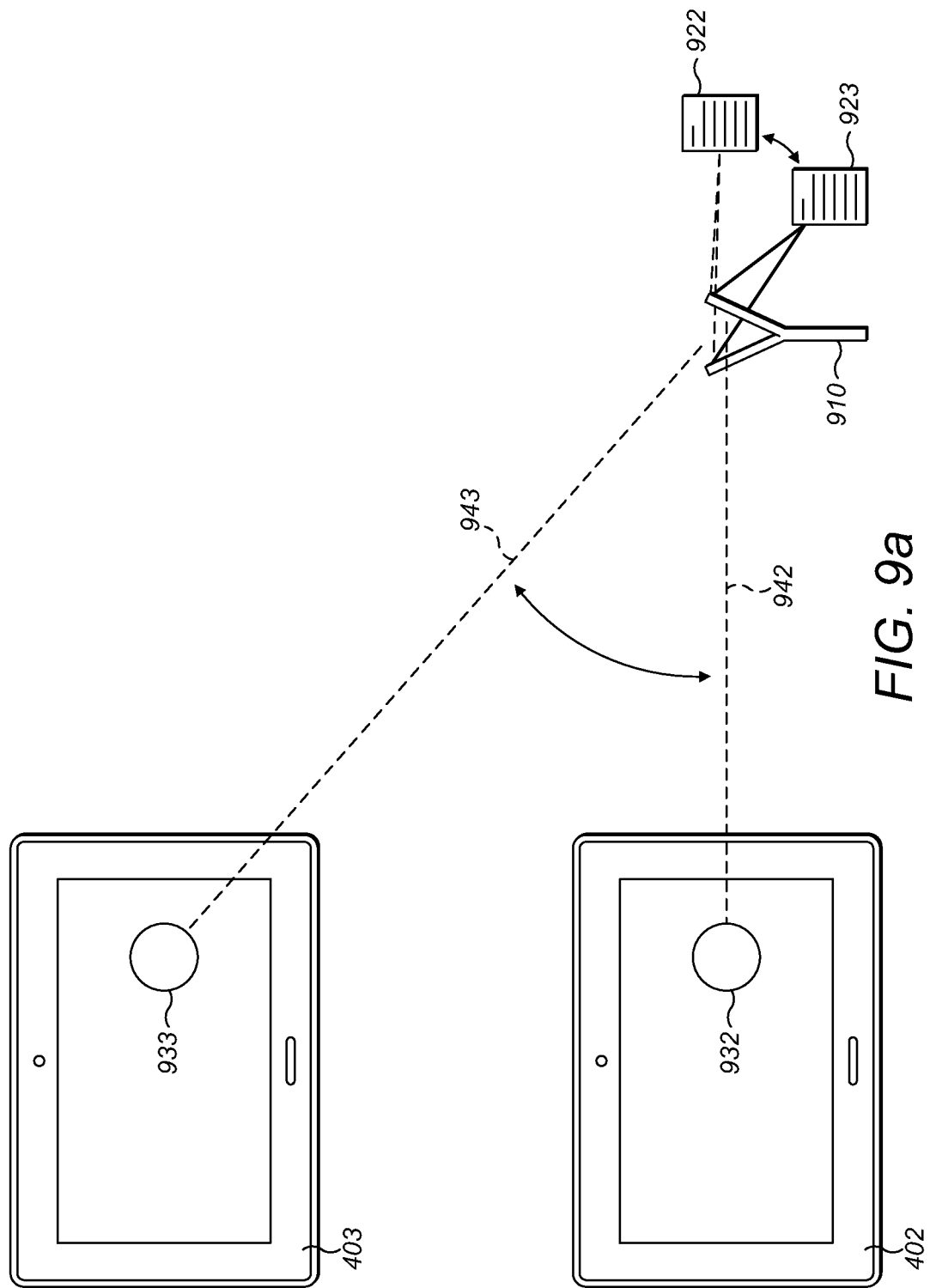

Receiving many files

Presenting content to all

Changing file to present

Cancelling presentation to all

Exiting/cancelling a meeting

Effect of removing device

Strong connection

Weak connection

METHOD AND APPARATUS FOR INTERCONNECTED DEVICES

FIELD OF THE TECHNOLOGY

The present disclosure relates to electronic devices and, more particularly, to user interfaces used within those devices for working with other electronic devices.

BACKGROUND

Electronic devices are in many cases provided with one or more displays for providing visual information to users of the devices. The electronic devices can be provided with user interfaces for display on the display of the device for facilitating user interaction with, and operation of, the device via one or more user inputs. These electronic devices can be instructed to interact with other electronic devices, which may be connected to a common network, as a result of input provided by the user. User inputs such as trackpads, trackballs, mice, cursors, touch screens and multitouch screens, can provide pointer-type controls usable to adjust the position of a pointer in multiple dimensions to allow interaction with the user interface by, for example, enabling navigation through menu systems, options, file systems, program shortcuts etc, and enabling selection and manipulation of visual elements and the items they represent.

BRIEF DESCRIPTION OF DRAWINGS

Examples of the present proposed approach will now be described in detail with reference to the accompanying drawings, in which.

DETAILED DESCRIPTION

General

Figure 1:
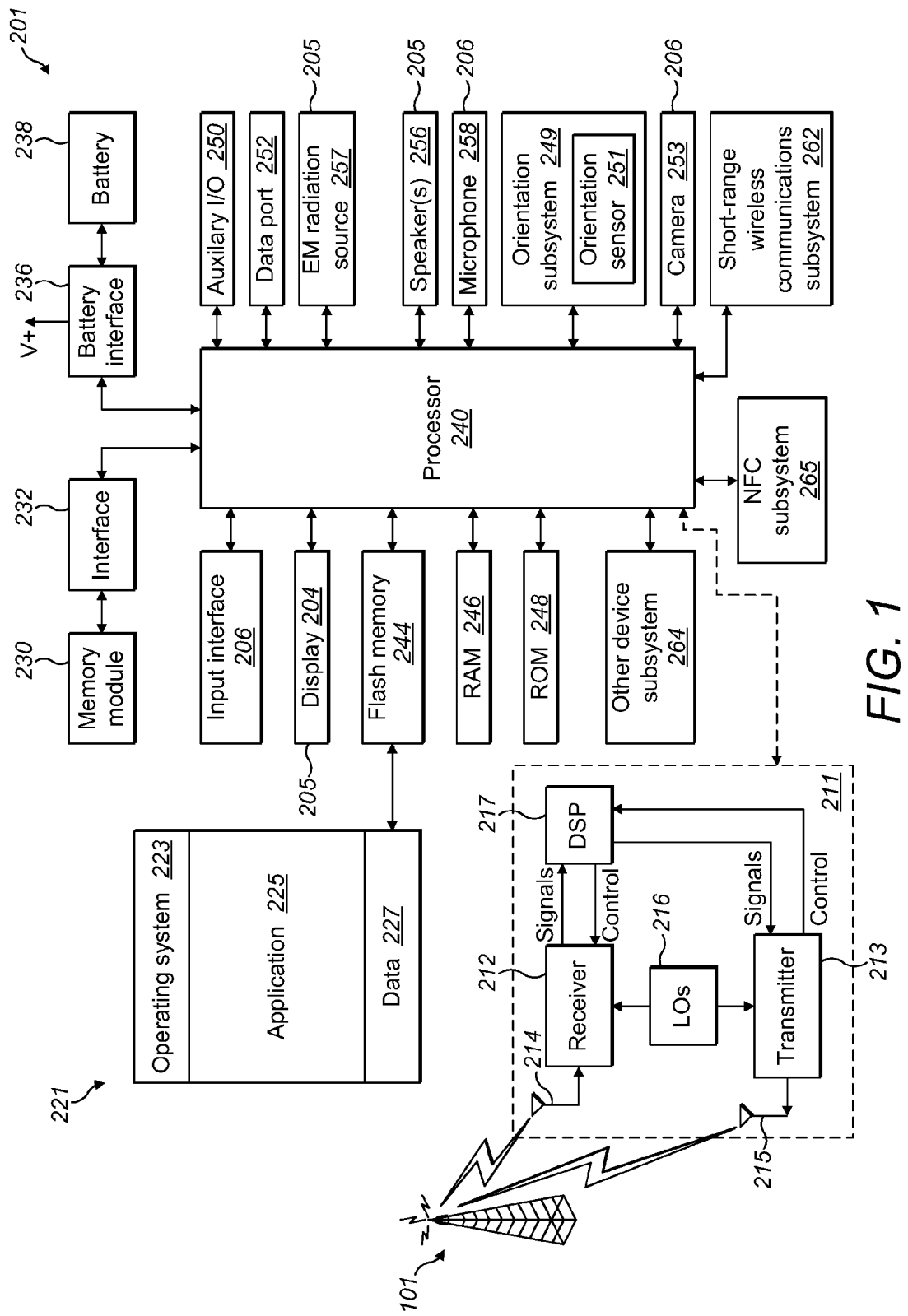
FIG. 1 is a block diagram illustrating an electronic device in accordance with example embodiments of the present disclosure.

There is a need for an easy way for multiple devices to establish a connection with one another so that users can interact with other devices intuitively and easily. Embodiments of the present disclosure that are directed to achieving these aims and are provided below:

In accordance with one embodiment, a computer implemented method comprises, at an electronic device having an input interface and a display: receiving information relating to a current relative location of at least one other electronic device; displaying on the display a representation of said at least one other electronic device and its relative location; and, receiving at said input interface user input associated with the displayed representation of said at least one other electronic device for communicating with said at least one other electronic device.

In certain embodiments the method comprises receiving updated information relating to the relative location of said at least one other electronic device. In this way the device has up-to-date knowledge of the relative position of said at least one other device.

In certain embodiments said representation of said at least one other electronic device is displayed near the periphery of a display area of the display.

In some embodiments said representation of said at least one other electronic device is displayed in a display area of the display closest to the relative location of said at least one other electronic device. In some embodiments displaying said representation of said at least one other electronic device includes adapting a characteristic of said representation to identify said at least one other electronic device.

In certain embodiments the method comprises detecting the orientation of said electronic device and displaying said representation of said at least one other electronic device in dependence on said determined orientation. In some embodiments the method comprises receiving information relating to the current location of said at least one other electronic device relative to an external reference point and displaying said representation of said at least one other electronic device in dependence on said received relative location information.

In certain embodiments the method comprises detecting user input comprising a gesture in the direction of the displayed representation of said at least one other electronic device. In some embodiments the method comprises receiving user input comprising selection of the displayed representation of said at least one other electronic device. In some embodiments the method may comprise moving an item displayed on the display towards the representation of the at least one other electronic device in response to the received user input.

In certain embodiments the method further comprises sending information to said at least one other electronic device in response to receiving the user input associated with the displayed representation of said at least one other electronic device. In some such embodiments said information comprises content associated with an item displayed on said electronic device.

In certain embodiments receiving user input comprises detecting user input at a touch pad of the electronic device. In some embodiments receiving user input comprises detecting a user gesture with a camera of the electronic device.

In certain embodiments receiving current relative location information comprises detecting a sound signal originating from said at least one other electronic device. In some embodiments receiving current relative location information comprises receiving an image of a reference pattern and comparing said image with an image of said reference pattern taken by a camera of said electronic device. In some embodiments receiving current relative location information comprises receiving information from an imaging system monitoring said electronic device and said at least one other electronic device. In certain embodiments receiving current relative location information comprises receiving GPS data. Other type of geo-positioning techniques can be employed.

In some embodiments receiving current relative location information is performed without said electronic device and said at least one other electronic device physically overlapping.

In accordance with one embodiment, a computer program product comprises memory comprising instructions which when executed by one or more of the processors of an electronic device having an input interface and a display cause the electronic device to: receive information relating to a current relative location of at least one other electronic device; display on the display a representation of said at least one other electronic device and its relative location; and, receive at said input interface user input associated with the displayed representation of said at least one other electronic device for communicating with said at least one other electronic device.

In accordance with one embodiment, an electronic device comprises: an input interface for receiving user input; a display; one or more processors; and, memory comprising instructions which when executed by one or more of the processors cause the electronic device to: receive information relating to a current relative location of at least one other electronic device; display on the display a representation of said at least one other electronic device and its relative location; and, receive at said input interface user input associated with the displayed representation of said at least one other electronic device for communicating with said at least one other electronic device.

In certain embodiments said electronic device is adapted to receive updated information relating to the relative location of said at least one other electronic device. In this way the device has up-to-date knowledge of the relative position of said at least one other electronic device. Based on the updated information received, the electronic device may also update other elements displayed such as the displayed representation of said at least one other electronic device and its relative location, a characteristic of said representation, or visual indications of items, files or other content sent from the electronic device to said at least one other electronic device.

In certain embodiments the electronic device comprises means detecting the orientation of said electronic device and displaying said representation of said at least one other electronic device in dependence on said determined orientation.

In certain embodiments the electronic device comprises a touch pad for detecting the user input. In some embodiments the display is a display screen and the touch pad is provided as a touch-sensitive overlay on the display screen to provide a touch-sensitive screen.

In certain embodiments the electronic device comprises a camera for detecting the user input. In some embodiments the electronic device comprises a camera for capturing an image of a reference pattern and wherein the electronic device is adapted to receive another image of said reference pattern and to compare said received image with said captured image for determining said current relative location of said at least one other electronic device.

In certain embodiments the electronic device is adapted to receive input from an imaging system monitoring said electronic device and said at least one other electronic device. In some embodiments the electronic device comprises a sound detector for detecting sound signals received from said at least one other electronic device. In some embodiments the electronic device is GPS enabled. The electronic device may be adapted to receive other geo-positioning information.

In certain embodiments the electronic device is adapted to receive current relative location information without said electronic device and said at least one other electronic device physically overlapping. In some embodiments said electronic device is portable.

In accordance with one embodiment, a plurality of electronic devices is adapted to communicate with one another in a connected environment, each device comprising: an input interface for receiving user input; a display; one or more processors; and memory comprising instructions which when executed by one or more of the processors cause the electronic device to: receive information relating to a current relative location of at least one other electronic device; display on the display a representation of said at least one other electronic device and its relative location; and, receive at said input interface user input associated with the displayed representation of said at least one other electronic device for communicating with said at least one other electronic device.

In accordance with one embodiment, a system comprises a plurality of electronic devices and an imaging system adapted to monitor the relative location of said electronic devices and to transmit information relating to the relative location of said electronic devices to each electronic device, wherein each device comprises: an input interface for receiving user input; a display; one or more processors; and memory comprising instructions which when executed by one or more of the processors cause the electronic device to: receive information relating to a current relative location of at least one other electronic device; display on the display a representation of said at least one other electronic device and its relative location; and, receive at said input interface user input associated with the displayed representation of said at least one other electronic device for communicating with said at least one other electronic device.

Other example embodiments of the present disclosure will be apparent to those of ordinary skill in the art from a review of the following detailed description in conjunction with the drawings, and may be related to a computer implemented method as well as the already described electronic device.

Definitions

Some of the proposed solutions in this application rely on user input. While the term user input is very broad, in the illustrative examples contained herein, a number of types of user input are used. However, the user inputs in the examples should not lead to the exclusion of other user inputs from the scope of the application when reference is made to a user input or gesture. A gesture includes a static or moving touch detected by a touch-sensitive display, a 3-dimensional (3D) spatial movement detected by spatial sensors, a touch or 3D spatial movement detected by an optical sensor, an audible input, including a voice command, detected by a speech or audible recognition device, depression of a physical key or button, and so forth. Other types of gestures may be successfully utilized. While the examples used are generally described with reference to touch screen devices, the proposed solutions can be used with other user input means such as track pads, mouse pointers, optical sensors, speech or audible recognition devices, physical keys, and one or more cameras. The concept of touching a point on the surface of a touch screen can be easily translated to other user interface gestures such as clicking on a point on a screen with a mouse, or pointing at a point with an off-surface gesture. The use of touch screen gestures in the example embodiments are purely for illustrative purposes and the scope of the proposed solutions are not limited to these user interfaces or these specific gestures.

In the examples presented herein, reference is made to "location Information" or "position information" of a mobile device. It is to be understood that there are many possibilities for the location or position information. In specific implementations, the information is presence information. In some implementations, the information includes coordinates of the location of the mobile device. The coordinates might, for example, be derived using GPS technology. More generally, the information includes any suitable information from which the location or position of the mobile device can be determined and may also include orientation information.

Example Electronic Devices

Reference will now be made to FIG. 1 which illustrates an electronic device 201 in which example embodiments described in the present disclosure can be applied.

An electronic device 201 such as the electronic device 201 of FIG. 1 may be configured to enter into a connected environment with another electronic device 201, which may also be of the type illustrated in FIG. 1. It will be appreciated that one or more of the electronic devices 201 which are configured to enter connected environment may be of a type which differs from the electronic device 201 of FIG. 1, and that some of the features, systems or subsystems of the electronic device 201 discussed below with reference to FIG. 1 may be omitted from electronic devices 201 which are configured to enter a connected environment with other electronic devices 201.

In the illustrated example embodiment, the electronic device 201 is a communication device and, more particularly, is a mobile communication device having data and voice communication capabilities, and the capability to communicate with other computer systems; for example, via the Internet.

Depending on the functionality provided by the electronic device 201, in various example embodiments the electronic device 201 may be a multiple-mode communication device configured for both data and voice communication, a mobile telephone, such as a phone, a wearable computer such as a watch, a tablet computer such as a slate computer, a personal digital assistant (PDA), or a computer system. The electronic device 201 may take other forms apart from those specifically listed above. The electronic device may also be referred to as a mobile communications device, a communication device, a mobile device and, in some cases, as a device.

The electronic device 201 includes a controller including one or more processors 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 is communicably coupled with additional device subsystems including one or more output interfaces 205 (such as a display 204 and/or a speaker 256 and/or electromagnetic (EM) radiation source 257), one or more input interfaces 206 (such as a camera 253, microphone 258, keyboard (not shown), control buttons (not shown), a navigational input device (not shown), and/or a touch-sensitive overlay (not shown)) associated with a touchscreen display 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a near field communications (NFC) subsystem 265, a short-range communication subsystem 262 and other device subsystems generally designated as 264. Some of the subsystems shown in FIG. 1 perform communication-related functions, whereas other subsystems may provide "resident" or on-device functions.

In at least some example embodiments, the electronic device 201 may include a touchscreen display which acts as both an input interface 206 (i.e. touch-sensitive overlay) and an output interface 205 (i.e. display). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller.

As noted above, in some example embodiments, the electronic device 201 may include a communication subsystem 211 which allows the electronic device 201 to communicate over a wireless network 101. The communication subsystem 211 includes a receiver 212, a transmitter 213, and associated components, such as one or more antenna elements 214 and 215, local oscillators (LOs) 216, and a processing module such as a digital signal processor (DSP) 217. The antenna elements 214 and 215 may be embedded or internal to the electronic device 201 and a single antenna may be shared by both receiver and transmitter. The particular design of the wireless communication subsystem 211 depends on the wireless network 101 in which electronic device 201 is intended to operate. Examples of wireless networks include GSM/GPRS, UMTS, and LTE.

The electronic device 201 may include other wireless communication interfaces for communicating with one or a combination of the above or other types of wireless networks. The auxiliary input/output (I/O) subsystems 250 may include an external communication link or interface; for example, an ethernet connection. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In some example embodiments, the electronic device 201 also includes a removable memory module 230 (typically including flash memory, such as a removable memory card)

and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

In at least some example embodiments, the electronic device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some example embodiments, the orientation sensor 251 is an accelerometer, such as a three-axis accelerometer. An accelerometer is a sensor which converts acceleration from motion (e.g. movement of the device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of the electronic device 201. The orientation data, in at least some example embodiments, specifies the orientation of the device 201 relative to the gravitational field of the earth.

In some example embodiments, the orientation subsystem 249 may include other orientation sensors 251, instead of or in addition to accelerometers. For example, in various example embodiments, the orientation subsystem 249 may include a gravity sensor, a gyroscope, a tilt sensor, an electronic compass or other suitable sensor, or combinations thereof. In some example embodiments, the device orientation subsystem 249 may include two or more orientation sensors 251 such as an accelerometer and an electronic compass.

The electronic device 201 may, in at least some example embodiments, include a near field communications (NFC) subsystem 265. The NFC subsystem 265 is configured to communicate with other electronic devices 201 and/or tags, using an NFC communications protocol. NFC is a set of short-range wireless technologies which typically require a distance of 4 cm or less for communications. The NFC subsystem 265 may include an NFC chip and an NFC antenna.

The electronic device 201 may also include one or more cameras 253. The one or more cameras 253 may be capable of capturing images in the form of still photographs or motion video.

In at least some example embodiments, the electronic device 201 includes a front facing camera 253. A front facing camera is a camera which is generally located on a front face of the electronic device 201. The front face is typically the face on which a display 204 is mounted. That is, the display 204 is configured to display content which may be viewed from a side of the electronic device 201 where the camera 253 is directed. The front facing camera 253 may be located anywhere on the front surface of the electronic device; for example, the camera 253 may be located above or below the display 204. The camera 253 may be a fixed position camera which is not movable relative to the display 204 of the electronic device 201 and/or the housing of the electronic device 201. In such example embodiments, the direction of capture of the camera is always predictable relative to the display 204 and/or the housing. In at least some example embodiments, the camera may be provided in a central location relative to the display 204 to facilitate image acquisition of a face.

In at least some example embodiments, the electronic device 201 includes an electromagnetic (EM) radiation source 257. In at least some example embodiments, the EM radiation source 257 is configured to emit electromagnetic radiation from the side of the electronic device which is associated with a camera 253 of that electronic device 201. For example, where the camera is a front facing camera 253, the electronic device 201 may be configured to emit electromagnetic radiation from the front face of the electronic device 201. That is, in at least some example embodiments, the electromagnetic radiation source 257 is configured to emit radiation in a direction which may visible by the camera. That is, the camera 253 and the electromagnetic radiation source 257 may be disposed on the electronic device 201 so that electromagnetic radiation emitted by the electromagnetic radiation source 257 is visible in images obtained by the camera.

In some example embodiments, the electromagnetic radiation source 257 may be an infrared (IR) radiation source which is configured to emit infrared radiation. In at least some example embodiments, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some example embodiments, the camera 253 is configured to capture at least some electromagnetic radiation which is not in the visible spectrum.

The electronic device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 includes a short-range communication subsystem 262 which provides for wireless communication between the electronic device 201 and other electronic devices 201. The short-range communication subsystem 262 may be used to provide a common user interface (UI) mode between the electronic device 201 and another electronic device 201 which may, in at least some example embodiments, be an electronic device 201 which is the same or similar to the electronic device 201 discussed with reference to FIG. 1. In at least some example embodiments, the short-range communication subsystem 262 is a wireless bus protocol compliant communication mechanism such as a Bluetooth® communication module or a WiFi module to provide for communication with similarly-enabled systems and devices.

The electronic device 201 stores data 227 in an erasable persistent memory, which in one example embodiment is the flash memory 244. In various example embodiments, the data 227 includes service data including information required by the electronic device 201 to establish and maintain communication with the wireless network 101. The data 227 may also include user application data such as email messages, address book and contact information, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the device memory.

The processor 240 operates under stored program control and executes software modules 221 stored in memory such as persistent memory; for example, in the flash memory 244. As illustrated in FIG. 1, the software modules 221 include operating system software 223 and other software applications 225 such a user interface (UI) module. In the example embodiment of FIG. 1, the UI module is implemented as a stand-alone application 225. However, in other example embodiments, the UI module could be implemented as part of the operating system 223 or another application 225 or collection of applications.

The UI module may be provided as a computer software product. The computer software product may be provided in, on or supported by a computer readable medium which could be provided as all possible permanent and non-permanent forms of computer readable medium either transitory in nature, such as in a data transmission signal for example sent over the internet, or non-transitory in nature such as in the RAM 246 of the device 201 or other, non-volatile storage such as memory 230. On the other hand the computer readable medium may be a non-transitory computer readable medium comprising all computer-readable media, with the sole exception being a transitory, propagating signal.

Figure 2:
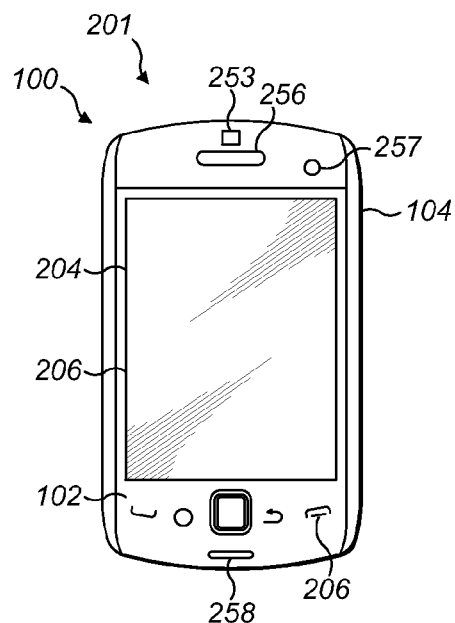
FIG. 2 is a front view of a mobile device in accordance with example embodiments of the present disclosure.

Referring now to FIG. 2, the electronic device 201 could be a cellular (or mobile) device 100. For example, the device 100 may have the ability to run third party applications which are stored on the device.

The device 100 may include the components discussed above with reference to FIG. 1 or a subset of those components. The device 100 includes a housing 104 which houses at least some of the components discussed above with reference to FIG. 1.

In the example embodiment illustrated, the device includes a display 204, which may be a touchscreen display which acts as an input interface 206. The display 204 is disposed within the device 100 so that it is viewable at a front side 102 of the device 100. That is, a viewable side of the display 204 is disposed on the front side 102 of the device. In the example embodiment illustrated, the display 204 is framed by the housing 104.

The example device 100 also includes other input interfaces 206 such as one or more buttons, keys or navigational input mechanisms. In the example illustrated, at least some of these additional input interfaces 206 are disposed for actuation at a front side 102 of the device.

Example Tablet Electronic Device

Figure 3:
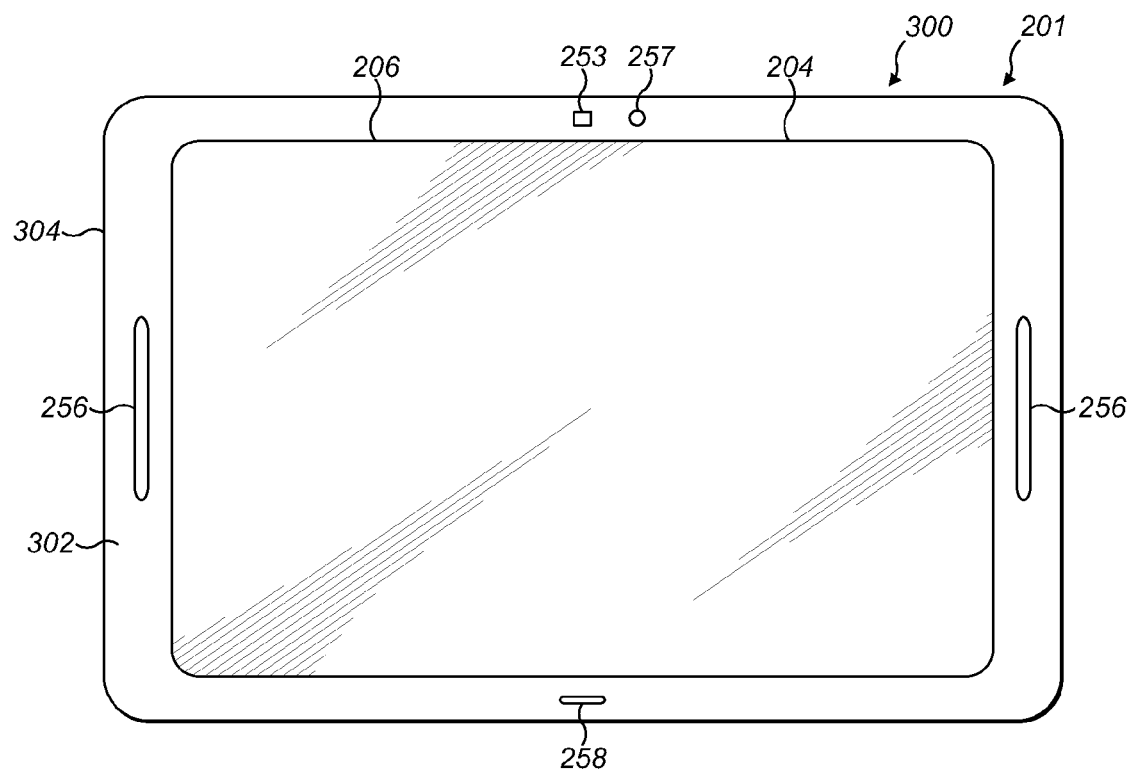
FIG. 3 is a front view of a tablet computer is accordance with example embodiments of the present disclosure.

Referring now to FIG. 3, a front view of another example of an electronic device 201, a tablet computer 300, is illustrated. The tablet computer 300 may include many of the same features and components of the device 100 of FIG. 2. However, the tablet computer 300 of FIG. 3 is generally larger than the device 100. The tablet computer 300 may include the components discussed above with reference to FIG. 1 or a subset of those components. The tablet computer 300 includes a housing 304 which houses at least some of the components discussed above with reference to FIG. 1.

The tablet computer 300 includes a display 204, which may be a touchscreen display which acts as an input interface 206.

The display 204 is disposed within the tablet computer 300 so that it is viewable at a front side 302 of the tablet computer 300. That is, a viewable side of the display 204 is disposed on the front side 302 of the tablet computer 300. In the example embodiment illustrated, the display 204 is framed by the housing 304.

Determining Relative Positions

When a user wishes to use one electronic device to interact with another, there needs to be a way for the user to indicate which other electronic device they wish to interact with. The user may select from a list of all devices within a common network that are in a mode ready for interaction. However, these lists may comprise of strings identifying the device, such as device IDs or network addresses, and therefore the user would only know which device to select if they already knew which identifying string related to which device.

A much more intuitive way for a user to identify another electronic device is to take into account the relative position of that other electronic device. In a local setting, where there a number of devices may be laid out on a table, while a user may not know the individual device IDs of the devices, they would be able to distinguish between them based on their spatial positioning on the table. Therefore, by providing a way for the devices to keep track of one another's relative positions, a user would be able to select a device based on its spatial position.

Figure 4:
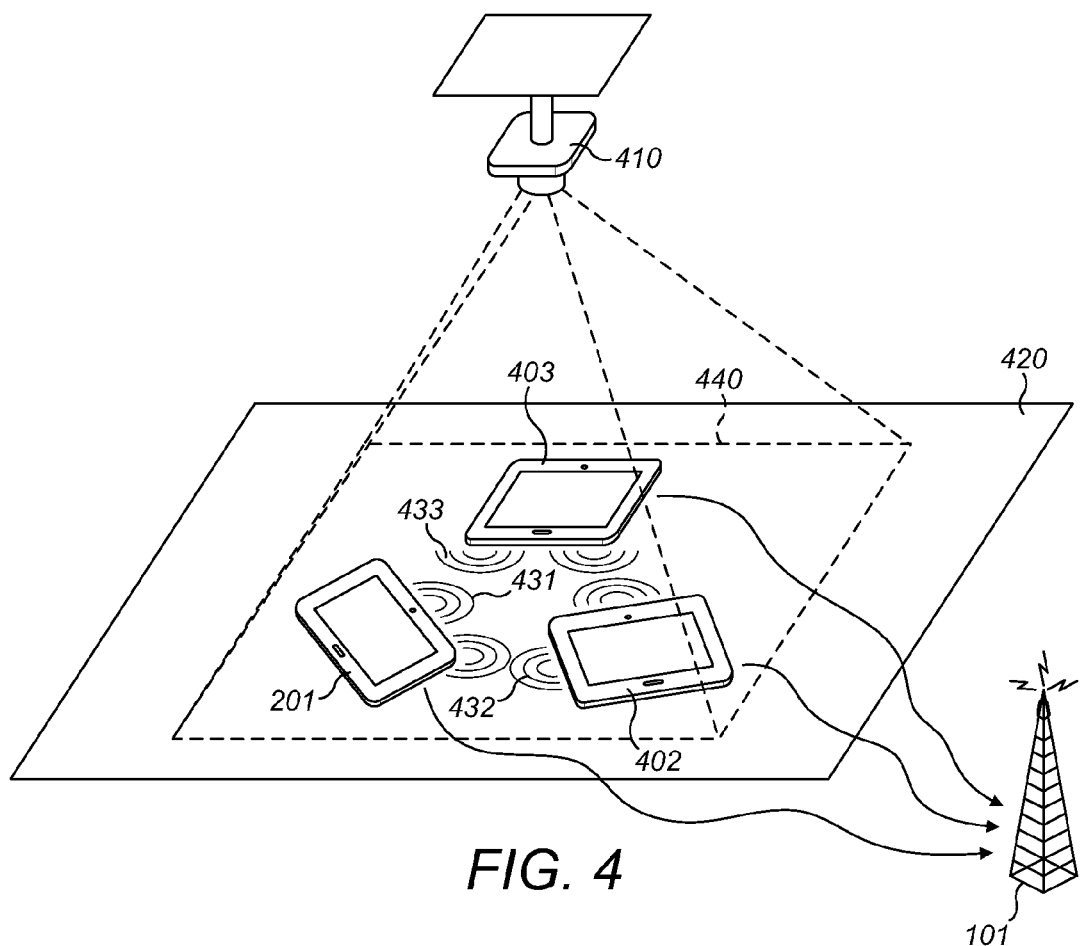
FIG. 4 shows a number of electronic devices arranged to receive the relative positional locations of one another through use of a camera and signalling between the devices.

There are a number of ways of tracking the relative positions of electronic devices, one of which is illustrated in FIG. 4. Here there are three electronic devices 201, 402 and 403 arranged on a surface 420 such as a table. Above the surface 420 is a camera 410 that can view everything within its line of sight 440. Using image recognition, the camera 410 can continuously track the positions of the electronic devices and send this information to them. All the devices may be connected to a common network 101 or be directly communicating with one another, for example via the NFC subsystem or the Wil or Bluetooth subsystem. The processing of the images from the camera 410 to determine the individual positions of the devices may be performed by a processor that is directly connected to the camera 410 or by the electronic devices 201, 402 and 403 themselves, or some other device (not shown) capable of communicating with the electronic devices 201, 402 and 403.

The camera 410 may take a single image of the relative locations of the devices and that alone could be used for determining relative locations of the devices, without necessarily tracking them. Alternatively, the camera 410 may take images at certain regular intervals. The smaller the interval, the more accurately the camera 410 can track the movements of the devices. The intervals may also be irregular, and triggered by certain events, for example when a device's accelerometer detects that it is being moved.

While a camera 410 can be used to identify the positions of the three discrete electronic devices 201, 402 and 403, there may also be a need to determine the identity of the devices so that the positional information can be associated with a specific device ID or network location. By doing this, when the positional information is sent to a device, it is able to determine what positional data is associated with itself and what is associated with other devices. There may be some visual identifier on the devices themselves, such as a barcode or QR code or any other identifying image, so that the camera 410 can immediately identify them. The devices may be prompted to display a visual identification on their displays to identify themselves or to emit an identifying sound that can be detected by an external microphone (not shown).

Positional information derived from the images that the camera 410 has taken can be complimented by the use of other methods of detecting relative positions. For example, the devices may emit sounds 431, 432 and 433, so that the microphones 258 or other sensor on the devices can triangulate the positions of the devices emitting the sounds. The sounds may be sub or ultrasonic so that they would not be detectable to the human ear, and may be of a unique pattern (such as frequency, modulation or amplitude) so as to be distinguishable. In one example where the camera 410 only takes one image or the interval between images is long, such alternative methods of detecting relative position can be used to provide a more frequent or even more accurate determination of relative positions.

As can be seen from FIG. 4, the camera 410 can only detect devices within its line of sight 440. Should one of the electronic devices move out of the line of sight 410 or be obstructed by a foreign object such as another electronic device or a user, the camera 410 may no longer be able to track the device. To overcome this potential problem, more than one camera can be used and be placed at different positions and angled in different directions. Alternatively, there may be one or more omnidirectional cameras that have a 360 degree field of view allowing for 3d positional information to be obtained. In some examples, by using a number of cameras, or modified cameras, it is possible to detect the relative positions of devices without being restricted to movements within a specific plane or a certain area. For example, with electronic devices 402 and 403 on the surface 420, it should still be possible to determine relative locations if a user removes their device 201 from the surface 420 as long as its relative positional information can still be determined. Therefore the proposed solutions allow for a flexible means of determining the relative positions of the devices that do not have to be restricted to pre-determined 2D planes of small areas.

Figure 5:
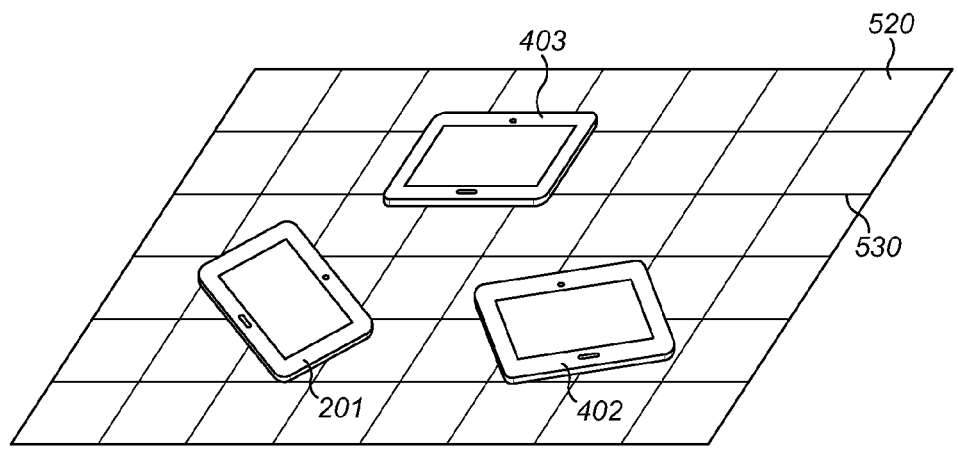
FIG. 5 shows a number of electronic devices arranged to receive the relative positional locations of one another through use of a modified surface.

FIG. 5 illustrates another way of determining the relative positional information of the devices that can be used, in addition to or instead of, any of the methods described so far. In this example, there are again three electronic devices 201, 402 and 403 arranged on a surface 520, however in this instance, the surface 520 has been modified to aid determining positional information. There may be some kind of grid 530 on the surface 520 that covers the surface and provides points of reference that the electronic devices use for determining their relative physical locations on the surface 520. For example, the grid 530 may be a pattern with position-dependent images, such as some kind of barcode like the Anoto dots used with smart pens, or location-dependent QR codes, or simply a position-dependent graphic. Cameras 253 or IR sensors or any other kind of sensor in the electronic devices can be used to detect these patterns on the surface 520 to determine its position on it.

Similarly, there may be a pattern on the ceiling, above the surface 520 that the electronic devices are placed on, and these devices can use their cameras 253 or other sensors to detect the patterns above them on the ceiling. The pattern may be a large barcode pattern, or could be the natural pattern of the ceiling (such as the positioning of lights and ceiling panels). The device may take an image of the pattern that it can see and compare that with the image of the pattern that another device can see to determine its relative position to that other device. The patterns need not be on the ceiling, but instead could be on the floor, with the electronic devices placed on a transparent surface to be able to view the patterns on beneath.

Another way of using a grid 530 on a surface 520 to determine the relative position of electronic devices on the surface 520 is to have a NFC (near field communication) grid. In this example the NFC readers 265 of the electronic devices can detect their positions on the surface, in conjunction with orientation data such as compass and gyroscopic data.

A further possible solution could involve an electronic device 201 sending information in the wireless network 101 about what it is currently displaying on its screen, so that when tracking with a camera 410, there can be a more distinctive image to track that also helps determine the identity of the tracked device 201. What is displayed on the screen 204 of the device 201 could be constantly changing, but the device 201 could also be transmitting information about the changing display.

An EM radiation source 257 such as an infrared transmitter could project a signal from the device 201 that reflects off the ceiling or other surroundings and can be subsequently detected by a sensor either on the device 201 or on another device. If no central system is being used to determine when each device should project onto a surface, the devices would need to be able to determine if any other devices are projecting onto the same surface. Like with CSMA/CD (carrier sense multiple access with collision detection) in ethernet settings, if the devices detect a collision, then one or more would stop projecting and wait a random, fixed or variable length of time before reattempting to project again until they succeed in projecting without interference from any other devices.

In the example embodiments of FIG. 4 and FIG. 5, three devices 201, 402 and 403 are used, however many more devices of different types could also be used or even simply a single device or two can determine their position relative to a fixed point if not another electronic device.

It will also be apparent that the devices 201, 402 and 403 in the example embodiments of FIG. 4 and FIG. 5 perform similar roles when determining relative location and are indeed similar devices. However, there can be different devices within the collaborative environment that perform different roles and still end in the same result. For example a device with more processing power than other devices in the connected environment may be tasked to perform more of the image processing to calculate the relative positions before transmitting its results to the other connected devices. Some devices may not have a screen at all and provide little or no means of user input, and may simple act as tracking devices (like 'smart' name badges). This could still be useful in a collaborative environment, as a user with a fully featured electronic device can still interact with devices with more limited features, by performing actions such as sending a file to that limited device (which can then automatically relay the file to the user's personal mail box) or retrieving information about the user associated with the limited device (which could be useful in the case where the limited device is incorporated into a name badge). However, there are many benefits to all the devices being equally or close to equally featured such as reducing compatibility complications when setting up the collaborative environment and when performing interactions between the devices.

As described above, to determine the location of each of the devices relative to one another, it is assumed in the illustrated examples presented, that at least some of the devices are equipped with means for determining their respective position, either autonomously or using an external service (such as a camera system as described above, a service location or geolocation service). It is also assumed each device has means, such as described above (e.g. via the Bluetooth, WiFi, NFC or other short-range communication subsystems or a combination thereof), for receiving location or position information of the other devices (either as a result of a request or autonomously).

Whilst a GPS receiver can be used to determine positional information, it is to be understood that alternative means for determining a position are possible and are within the scope of this disclosure. For example, a device position can alternatively be determined based on cell/sector identification within a wireless network. As another example, geographic location can be determined using triangulation of signals from in-range access points, hotspots, or base towers, such as those used for Wireless Enhanced 911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile device signals exhibit at different locations in each cell. Position information can be obtained not only by triangulating the device's position based on nearby cell towers but also based on signals from nearby Wi-Fi access points or hotspots via a WLAN radio. Positional information can also be obtained using the device's accelerometer. Other means for determining a device position using a Bluetooth, WiFi, NFC or other short-range communication subsystems or a combination of the above may be possible.

Initiating a Meeting

In the above section, examples are provided for determining the relative positions of devices. This may be initiated in response to the devices entering a collaborative mode or in preparation prior to entering such a mode. Simply connecting a device 201 to a wireless network 101 within a meeting room or having the device 201 detected by any one of the detection means (such as camera 410, NFC grid 530 or detection of an audio signal) may either prompt a device 201 to enter a collaborative mode, or to start tracking its position, or it may do these to the device 201 automatically.

The electronic device 201 may have software that allows a user to start or participate in a meeting with other electronic devices. The user may choose to manually start a meeting by providing a user input to the electronic device (for example pressing on the "start" button on a meeting app), or the user may be prompted to start a meeting once entering and being detected as present in a meeting room, as described above. Once the meeting begins initiation, the user may be prompted for a password or other security measure. There may be a countdown displayed on one or more devices that indicates when the meeting will start. This countdown may be of the form of numbers indicating time left, overlaying the display 204 or through some other indication, such as an audio prompt or visual effect that may indicate a gradual build up to the start of a meeting, or might only provide a single indication that the meeting is about to start or has started.

Figure 6A:
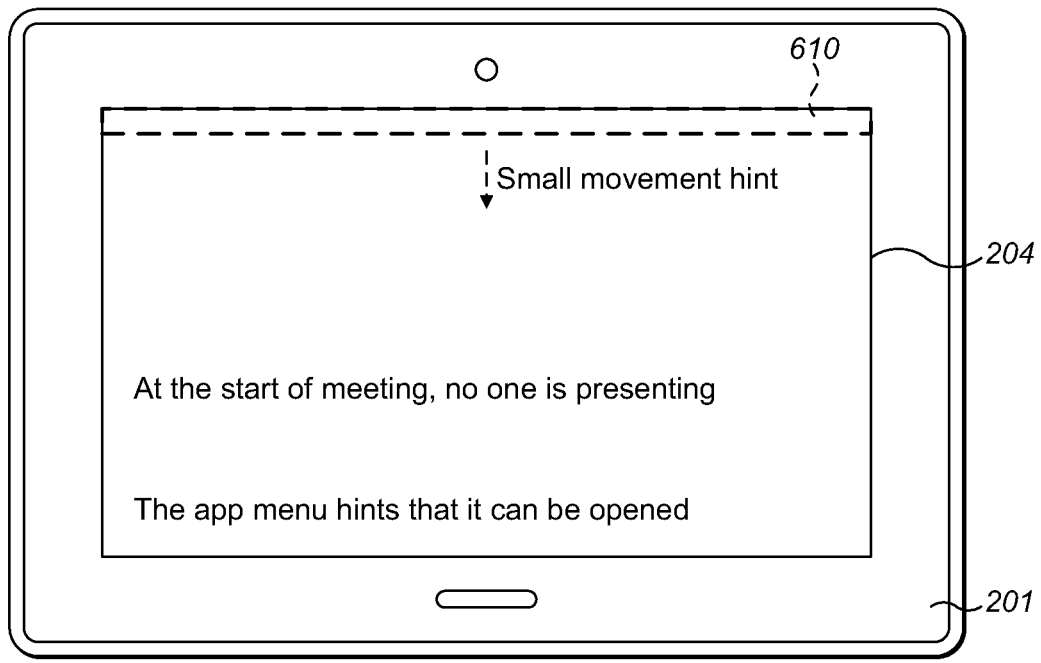
FIG. 6 illustrates the steps of initiating a meeting and previewing content in an electronic device.
Figure 6B:
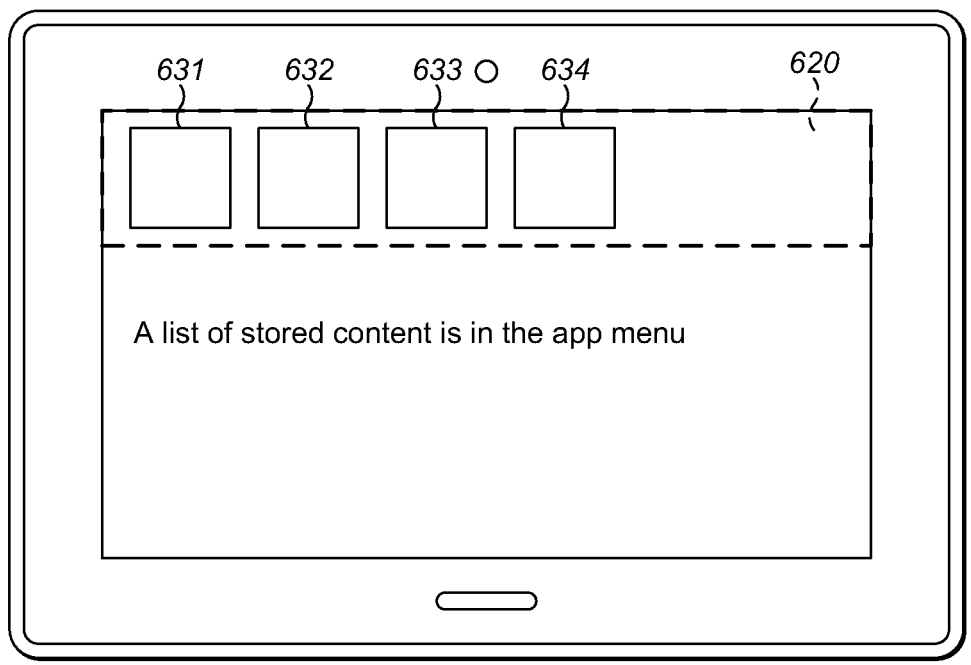

Once a meeting has been initiated, the user may be presented with a user interface like that shown in FIG. 6a. Most of the screen 204 may consist of a simple wallpaper as no one has started presenting, with a small indicator 610 of an app menu indicating that it can be opened by performing a user input. Such a user input may be a touch or a swipe of the minimised app menu 610, and doing so results in an expanded app menu 620 as shown in FIG. 6b. The app menu 620 may contain a list of content items (631 to 634) that a user can view that are either stored locally on the device or elsewhere.

Figure 6C:
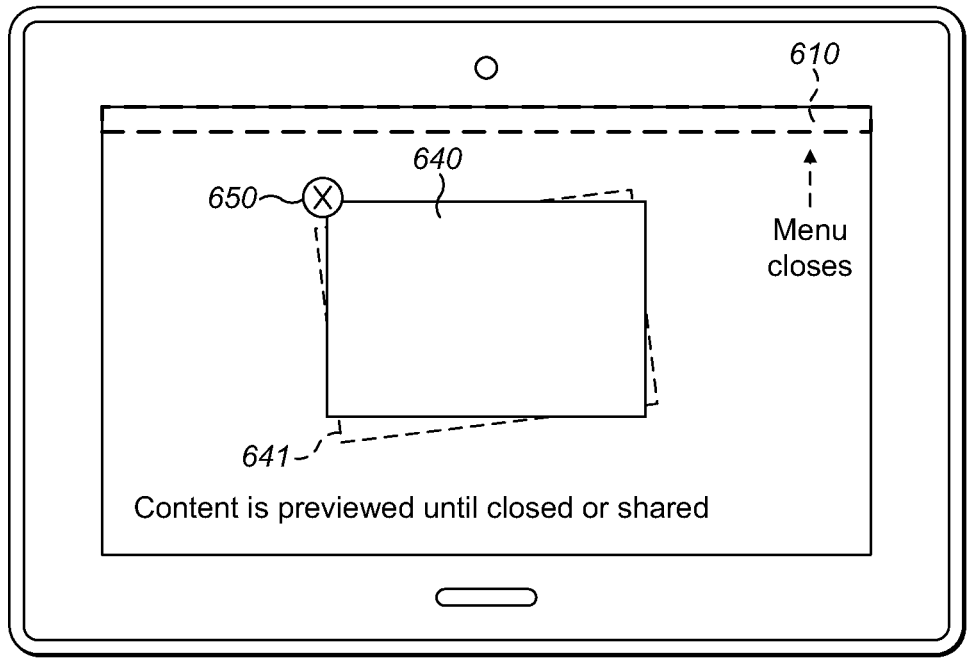
Figure 6D:
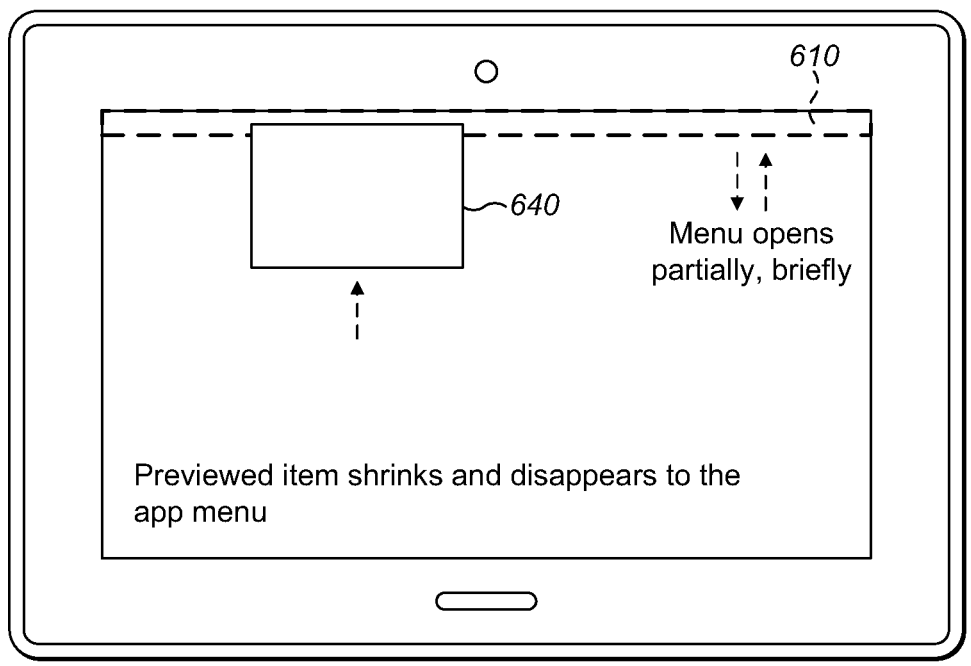

Once one of the content items in the app menu 620 is selected, the app menu 620 may automatically close or minimise and a preview 640 of the selected content item is displayed, as illustrated in FIG. 6c. There may be a user interface component 650 (like an X symbol) on the preview 640 that allows the user to perform an action on the previewed item (such as stopping the preview). If the user has multi-selected a number of content items from the app menu 620 or has subsequently selected more content items from the app menu 620, the previews 641 for these content items may also be displayed, but may be obscured by other content items and may not have the same user interface component 650 available to them as the previewed content item 640 displayed at the front. By receiving a user input to the user interface component 650, such as a tap, could result in the previewed content item 640 or group of content items to shrink and disappear to the app menu 620 as shown in FIG. 6d. The minimised app menu 610 may provide some indication that the previewed content item 640 has returned to the app menu by briefly opening partially as the content item 640 disappears into it.

Sharing Content

One action that users in a collaborative environment may want to perform is the sharing of content. To share content, a user has to indicate what content they wish to share and also who to share it with. As discussed earlier, a user may select from a list of user or device IDs, or network addresses to indicate which devices to share content with. However, with relative positional information available to the devices, it is possible to provide a much more intuitive way of performing actions in a collaborative environment.

Figure 7:
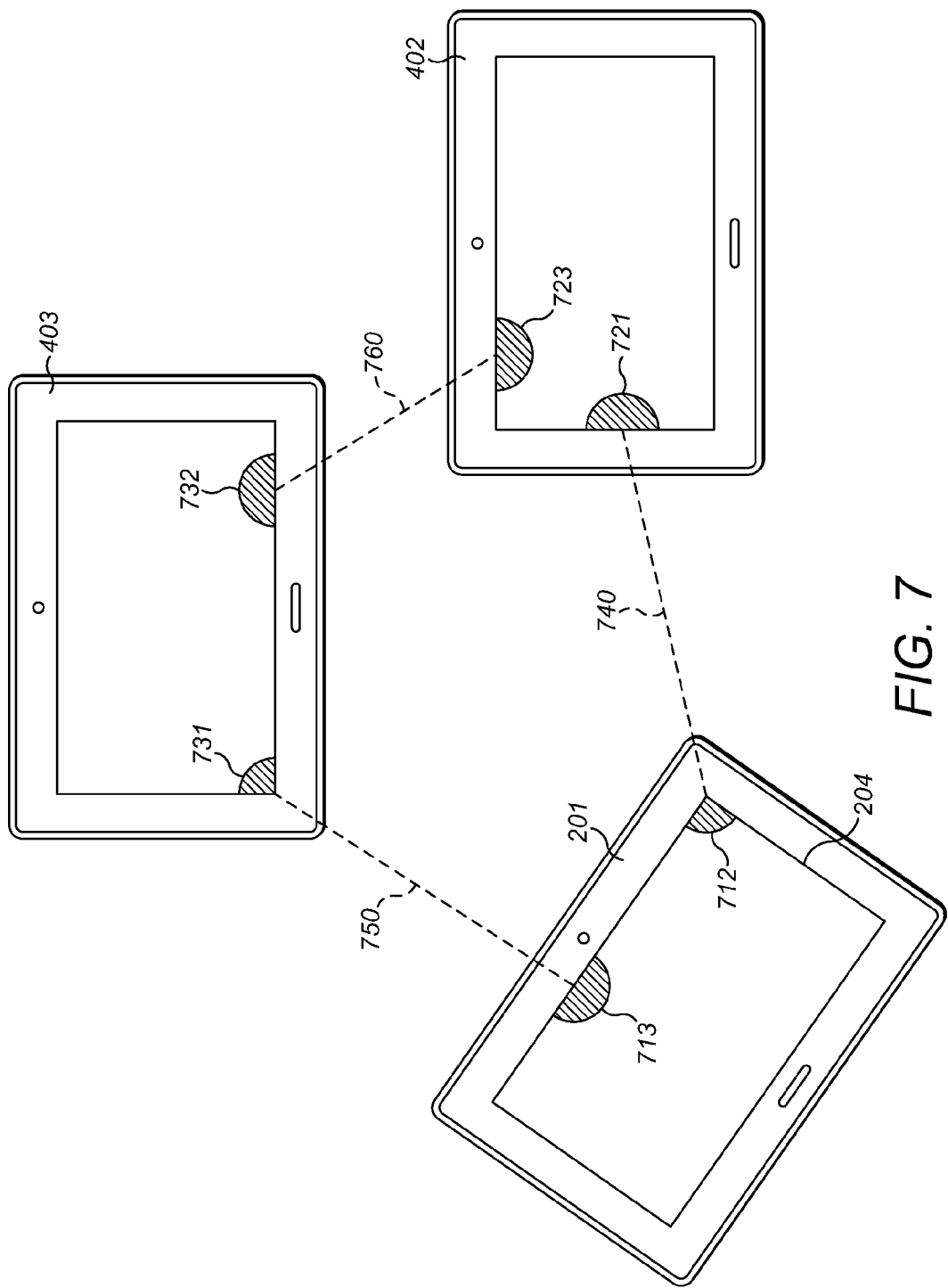
FIG. 7 shows a collection of electronic devices displaying relative positional information of nearby electronic devices on their screens.

FIG. 7 illustrates one way that relative positional information can be used to aid a user in identifying nearby electronic devices for interacting with. In this example, three electronic devices 201, 402 and 403 are laid out on a surface and have access to the relative positional (including orientation) information of one another. From the point of view of a user working with device 201, while the user may not know the device ID of the other devices 402 and 403, the user does know that in direction 740 is device 402, and in direction 750 is device 402. Therefore if a user were to provide user input directed at device 402 they would intuitively point in the direction 740. The device 201, could therefore place a graphical representation 712 on the screen 204 to indicate the position of the device 402 relative to itself and to indicate to a user that if they provided a user input on or toward this graphical representation 712, they may be able to interact with the device 402 associated with the representation 712.

Similarly, there may be graphical representations of all the devices within the collaborative environments on each of the screens of each of the devices. For example, device 201 may also have a representation 713 of device 403, device 402 may have representations 721 and 723 of devices 201 and 403 respectively, and device 403 may display representations 731 and 732 of devices 201 and 402 respectively, the positioning of the graphical representations being determined by the directions 740, 750 and 760 of the devices 201, 402 and 403 relative to one another.

The representations of other devices do not have to be displayed on the devices. Instead, there may just be regions on the screen that can be interacted with. The reasoning being that if a user can already see the actual position of another device in reality, they may not need a graphical representation to show them where they need to interact with as they would intuitively be able to determine where they should direct their user input by simply looking at the relative position of the other device to their own. On the other hand, it may be advantage to show a graphical representation anyway to give an unambiguous indication to the user that they can interact with another device.

As the position or orientations of the devices change, so will the directions 740, 750 and 760 relative to the devices, and therefore, if the positions are being tracked (continuously, regularly, or irregularly), the positions of the representations on the screens 204 should also change to match the changing physical positions of the devices.

The graphical representations may be simple graphical elements (like 713 and 732) that only indicate the relative position of another device, or they can also provide further useful information, like the name or picture of the user associated with the other device.

These representations allow a user to easily identify other devices in the collaborative environment. FIGS. 8a to 8d illustrate how these representations can be used to provide an intuitive way of sharing content with other devices from the point of view of device 201, which, in this example, is in a collaborative environment with four other devices.

Figure 8A:
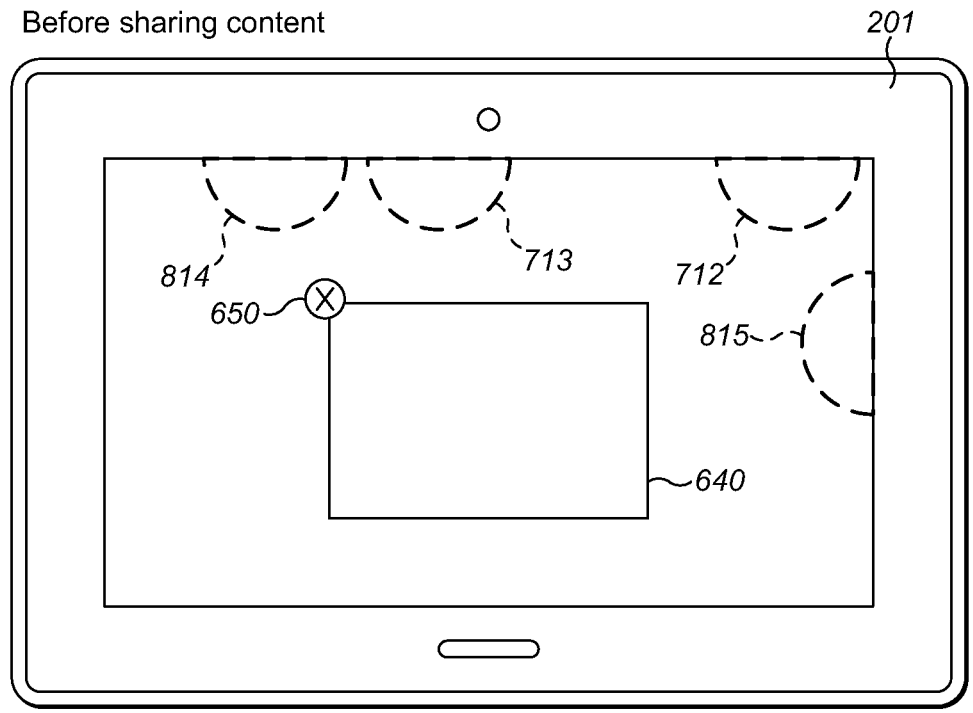
FIG. 8 illustrates a method of sharing content between electronic devices through use of visual representations of nearby electronic devices on the displays of the electronic devices.

In FIG. 8a, while a user is previewing content 640 on their device 201, visual cues show the user what actions the user could perform on the previewed content item 640. As discussed before, a user interface component 650 may be displayed to show that the preview can be closed, but also, representations (712, 713, 814 and 815) of devices may be displayed to indicate that the previewed content 640 can be shared with those devices. The representations may be subtle representations (such as slightly transparent) and may have different colours depending on which device they represent.

Figure 8B:
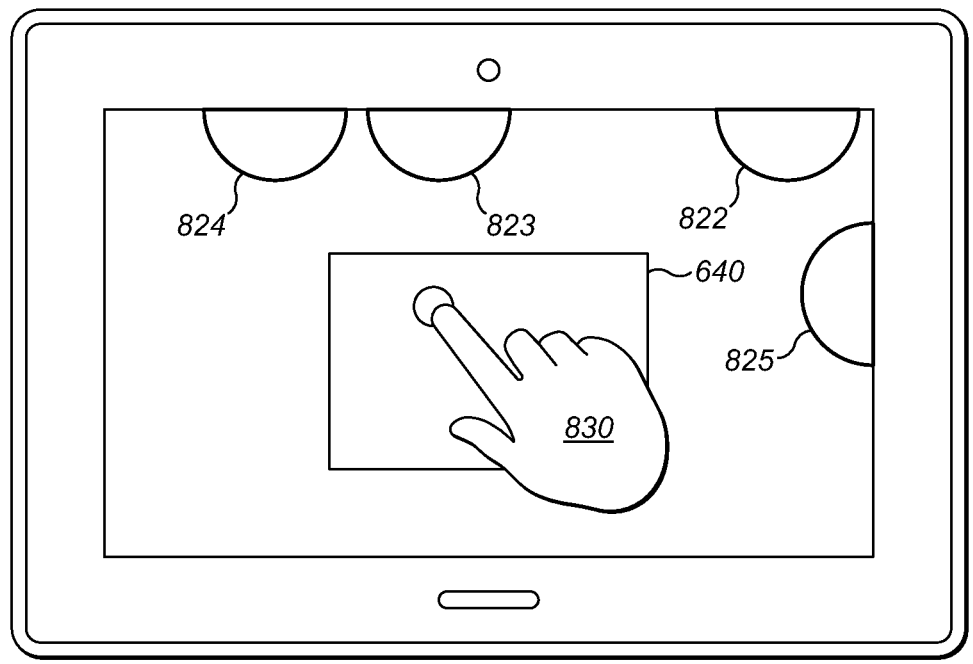

When the device detects a user input on the previewed content item 640 (such as the user pressing 830 on it), the user interface may provide stronger hints that the user can share the content item. The visual representations of the other devices may now become more prominent (for example, by becoming more opaque or by changing size) as shown in FIG. 8b where graphical representations 712, 713, 814 and 815 have now changed to 822, 823, 824 and 825 respectively.

Figure 8C:
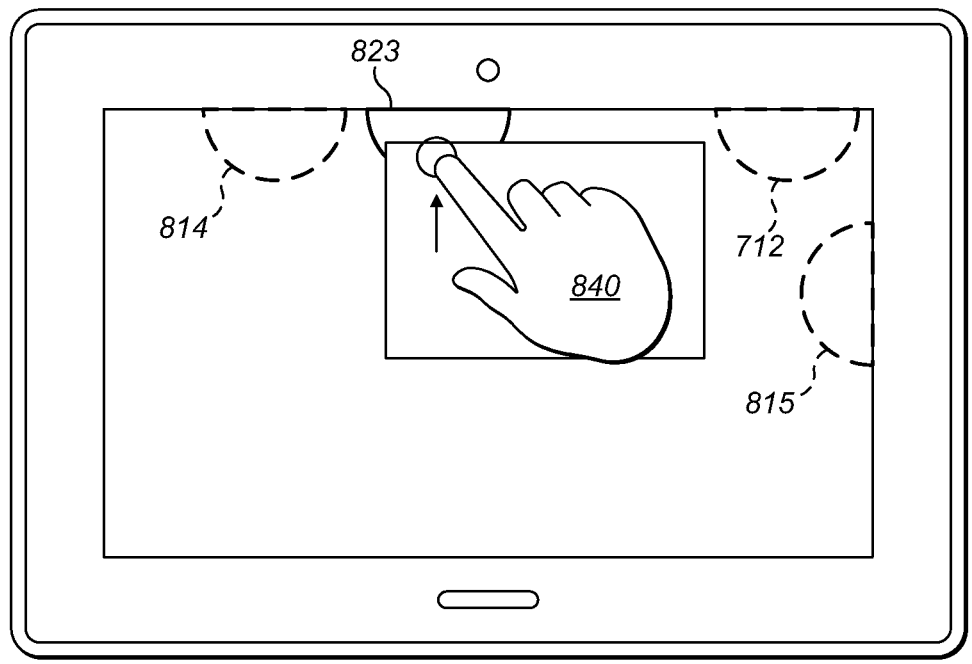

Once the user has decided which device they want to share the previewed content item 640 with, they can provide a user input directing the previewed content item 640 toward the graphical representation 823 of the device 403 they wish to share with as shown in FIG. 8c. Such a user input may be a swipe 840, or moving the previewed content item 640 over the graphical representation 823, or it could be merely a swipe towards the representation 823, such as a flicking motion.

On performing this gesture (but not completing it by releasing the finger), a further indication can be provided to the user to show that the completion of the gesture will result in a sharing of content. This indication may involve all the other representations becoming less prominent (such as by becoming more transparent) or may involve the targeted representation providing a further visual indication, such as by performing an animation. There may also be an indication at the target device indicating that a transfer may be about to be initiated.

Figure 8D:
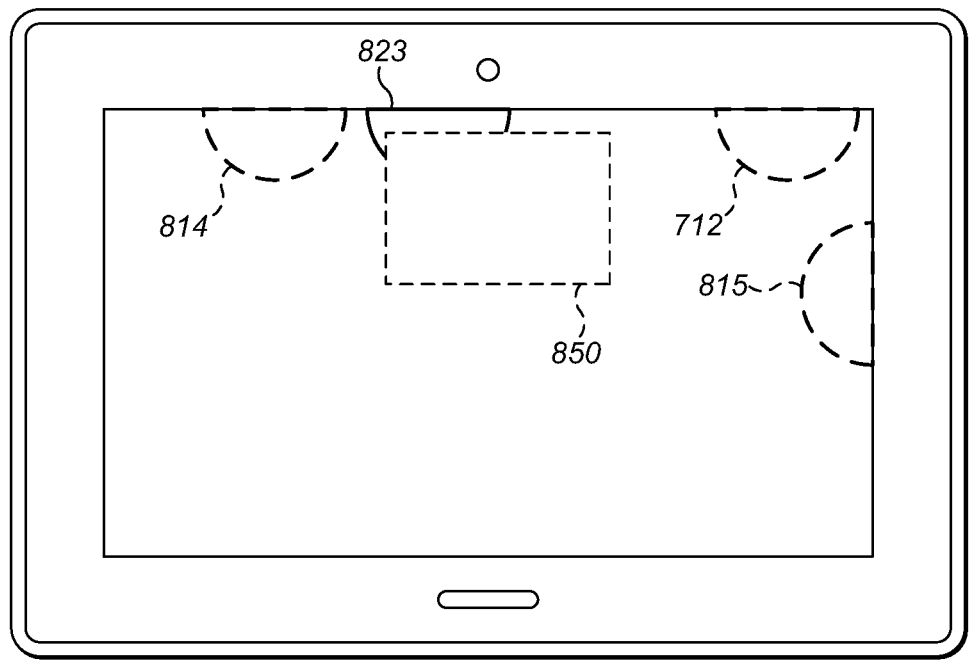

At FIG. 8d, a result of completing the gesture is shown. By dropping the previewed content item 640 onto the target representation, the initiation of sharing may be indicated to the user. This indication may be in the form of an audio cue or a visual cue, like the previewed content item 640 performing a particle dissolving affect 850 towards the target representation, or any other kind of indication such as haptic feedback. Once the content has been shared with the other device, the visual representation of the devices may eventually disappear until the next opportunity to interact with them arises (such as by selecting another content item).

Figure 9B:
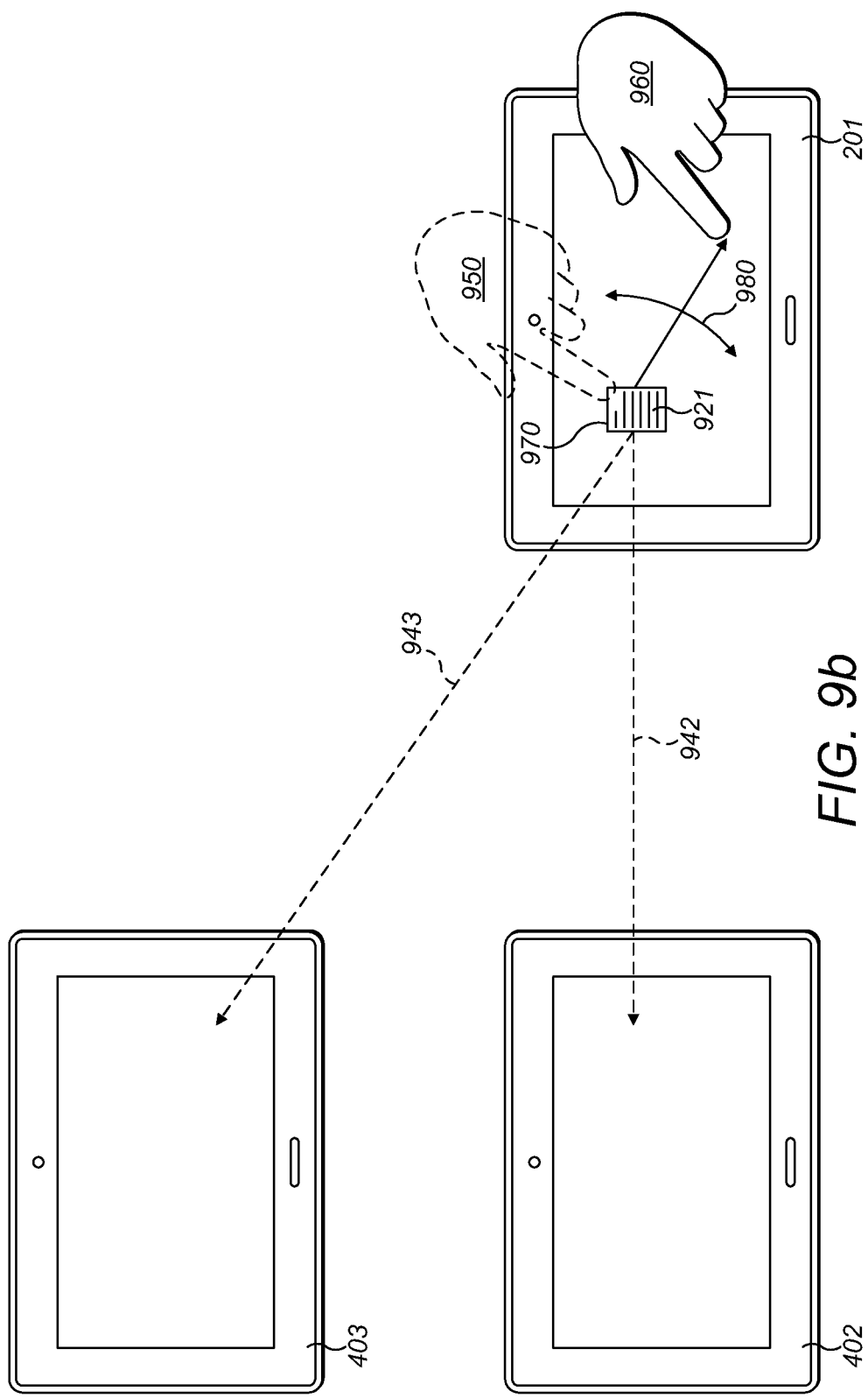
FIG. 9 illustrates a method of sharing content between electronic devices through use of a slingshot gesture.

Another way of sharing content with other devices is shown in FIG. 9a and FIG. 9b where a 'slingshot' gesture is used. FIG. 9a illustrates the concept of the gesture, while FIG. 9b shows an example implementation.

If a user wanted to share or transfer a file 921 (or any other content item) with another device (402 or 403), rather than directing user input toward the target device as described in previous examples, one could perform a 'slingshot' gesture where the file 921 is provided user input away from the target device instead. If a file 921 were originally located at the position of a notional slingshot 910, a user can drag the file back, as though it were attached by elastic material to that notional slingshot 910. For example, if a user dragged back a file to position 922, if a user released it then it would move in direction 942, assuming a slingshot-like behaviour, to device 402. Similarly, dragging back the file to position 923 and releasing would result in it moving in direction 943 towards device 403.

By dragging the file 921 back, there may be some visual indication (such as 932 or 933) indicating that releasing the file will result in the file being shared with the target device. It would be easy to cancel such a gesture, for example, by returning the file to its original position near where the notional slingshot 910 is. By using a slingshot mechanism, the user is provided with an intuitive and easy to understand way of interacting content items, while also keeping the user engaged in the activity.

FIG. 9b shows an example implementation of the slingshot gesture. The user of a device 201 may initiate a user input (such as a drag 950 to position 960). The user can then decide on which device (402 or 403) to share with by altering the angle 980 before releasing. While performing the drag, a visual indication may be provided on the user's device 201 or also or instead on the target devices, by displaying the predicted trajectory of completing the gesture, and thereby showing where the file 921 will end up. By returning the file to the original position 970, the 'slingshot' gesture can be cancelled. Despite what is happening conceptually, a graphical presentation of a slingshot may not need to be shown on the screen 204 of the device 201 itself as the action should be intuitive enough to the user without the visual cue.

The visual indications (like 932) that appear while performing the slingshot gesture may simply indicate which other device 402 the sending device 201 will send the file 921 to on completing the gesture. However, it could also provide an indication of more detailed actions that can be performed with the slingshot gesture. For example, if a user can see how their dragging 960 affects the positioning of the visual indication 932 shown on a target device 402, then the user can perform fine movements to not only help decide which device to send the file, but also where within that device to send it. There may be folders on the target device 402 displayed on the screen, and if the user performs a drag movement 960 such that the visual indication 932 hovers over that folder on the target device 402, then completing the slingshot gesture may result in the file 921 transferring to the target device 402 and being stored within that folder on the target device 402. With this finer control, it may be possible for a user to direct content not just to specific folders on the target device 402 but to specific applications or functions. This functionality need not be limited to the slingshot gesture, but any user input that can be directed to a target device. One such user input is described next.

Figure 10A:
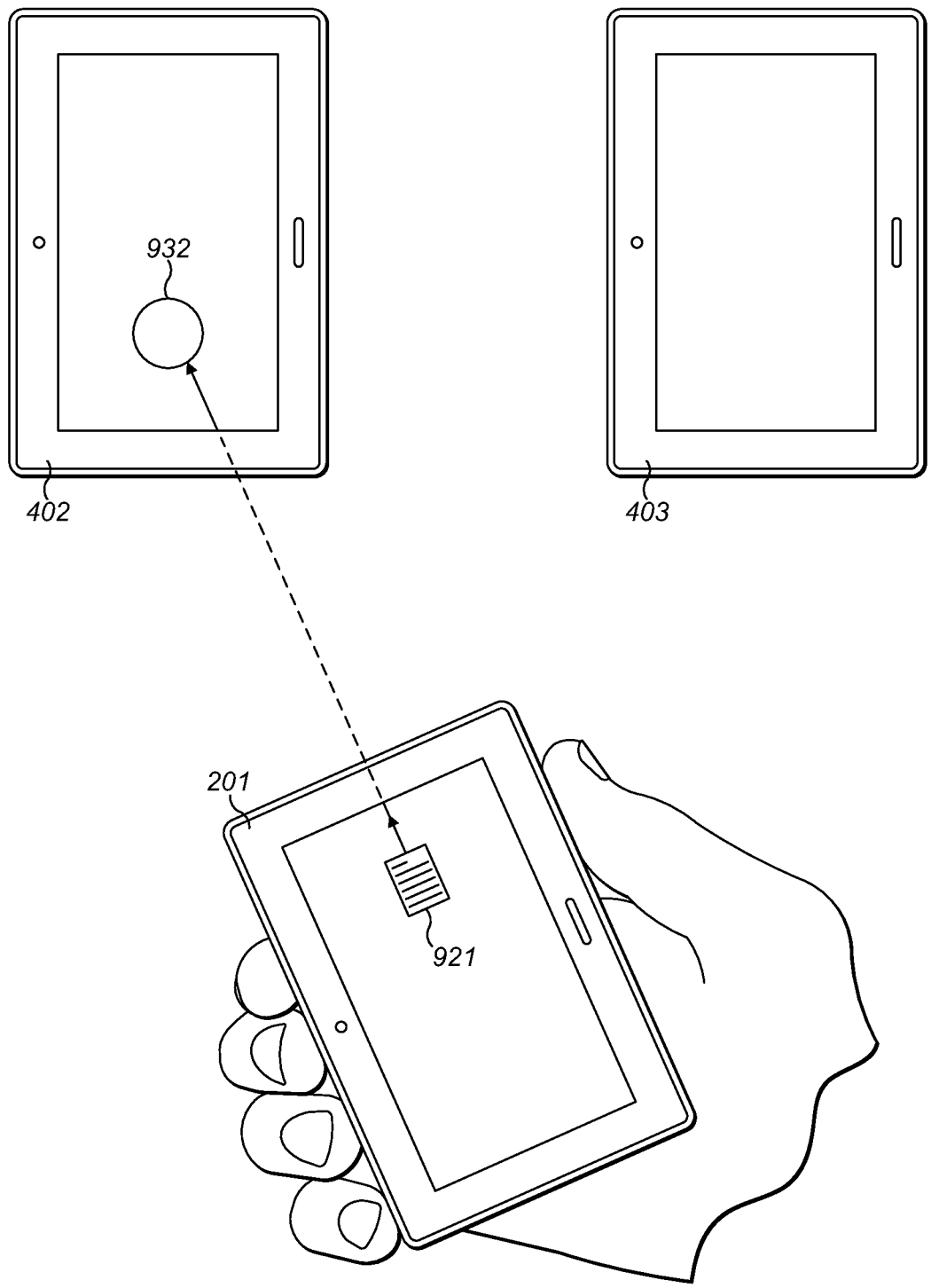
FIG. 10 illustrates a method of sharing content between electronic devices by pointing the electronic devices at other electronic devices.
Figure 10B:
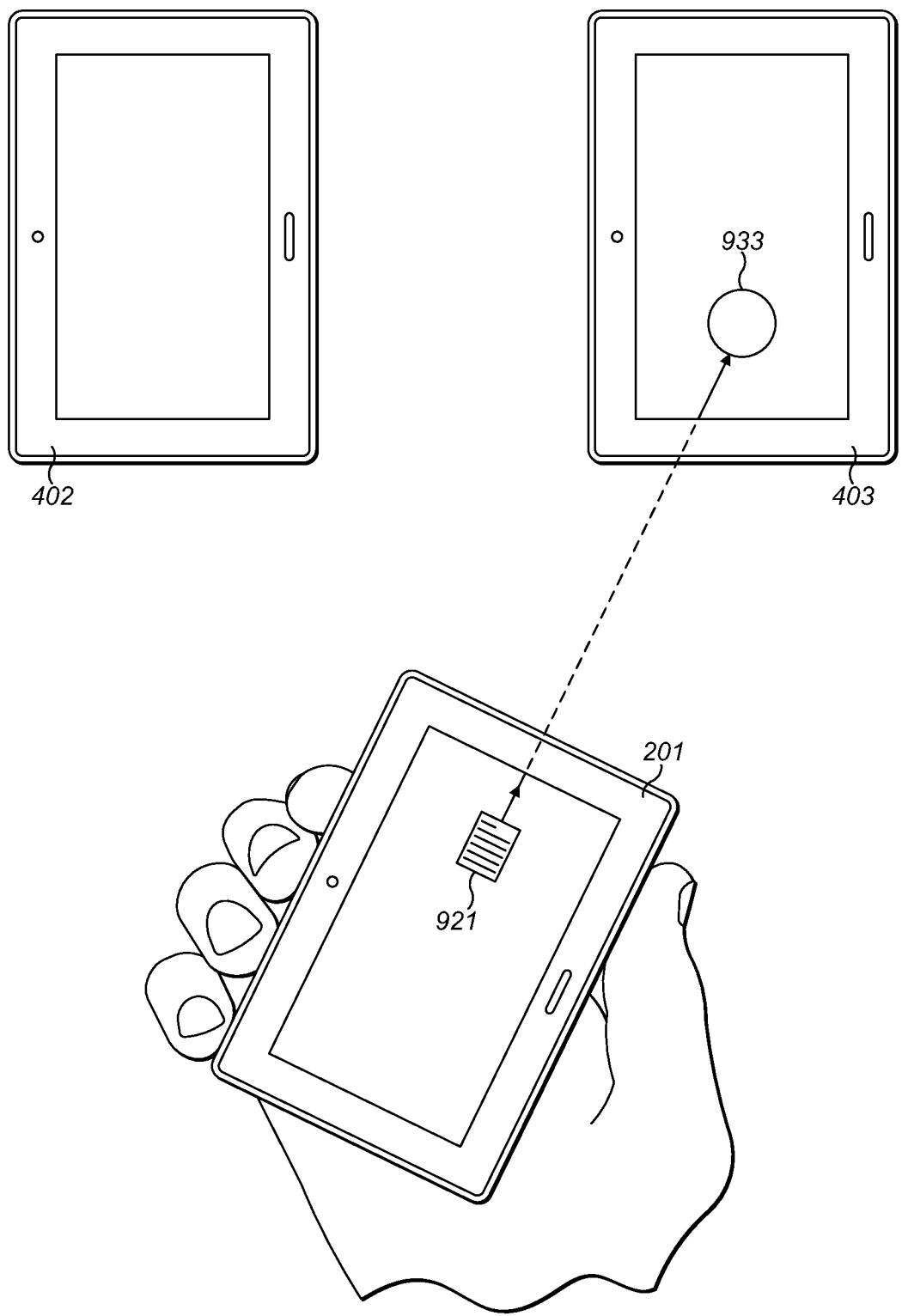

Another way of sharing or transferring a file with another electronic device is illustrated in FIG. 10a and FIG. 10b. Rather than providing a user input to an input interface 206 (such as a touchscreen) of an electronic device 201, the user could manipulate the device 201 itself to indicate a target for sharing. In FIG. 10*a*, a user has selected a file 921 and has the option to share that file with either of devices 402 and 403. By pointing the actual device 201 at the target device 402, the user can indicate where they wish to share the file 921 with.

The user may instead choose to point the device 201, like a laser pointer, at device 403, therefore indicating that they wish to share the file 921 with that device 403 (as shown in FIG. 10*b*). A visual indication can be provided to show the intended target before the user has actually initiated the share, so that the user is aware what the result of their action is likely to be. This visual indication may show the expected final position of the file on the target device (such as 932 or 933), or could indicate the predicted trajectory of the file 921.

As the devices are aware of one another's relative positions and orientations this type of interaction is possible. However it should be clear that in this situation, real-time tracking information is only needed for the device 201 being moved and not necessarily for the devices remaining stationary. In fact this method could still work with only information from an orientation sensor 251 of the device 201 such as a digital compass, and without the need for updated positional information.

In the above examples, methods are shown for transferring or sharing a file, however, these methods need not be limited to transferring files, but could send any kind of content such as strings of data, pointers to files or even requests for data or actions from the target device. The result of the transfer action may simply result in the visual representation of content appearing on the display of the target device, rather than the actual data associated with it.

The examples illustrated in FIG. 10 show that user input need not be limited to touch screens, but can also be a user-triggered change in position or orientation of one or more of the devices. Another example could be 'off surface' gestures, where a user performs gestures in the air, without having to make contact with any detecting surface. Off surface gestures could be monitored by cameras 253 on the devices 201, but could also be monitored by the cameras 410 already being used to monitor changing positions of the devices.

Figure 11:
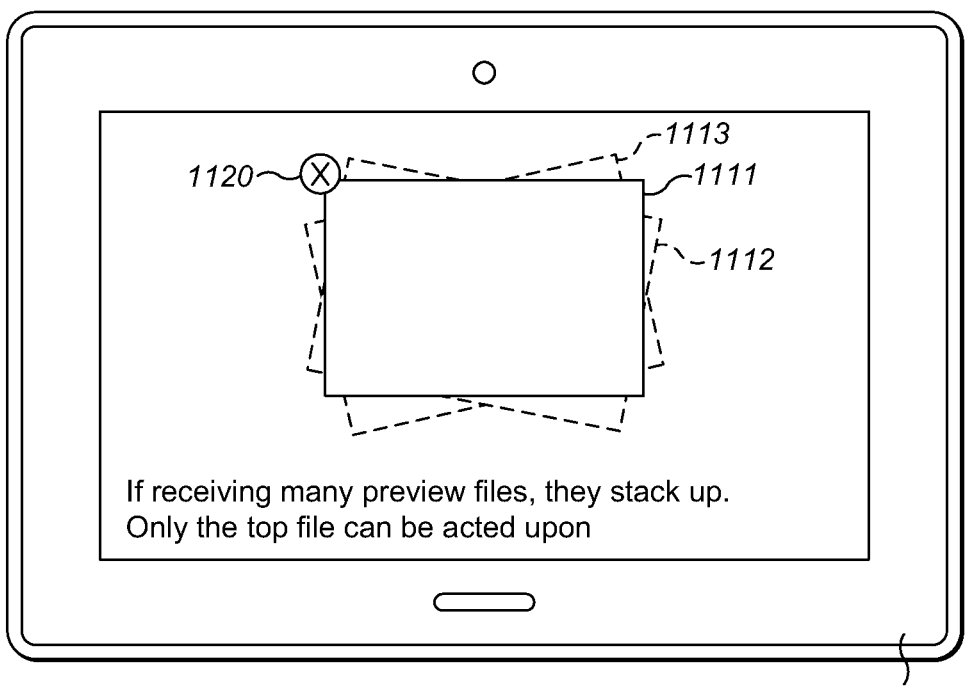
FIG. 11 illustrates one way of displaying a number of received files on the display of an electronic device.

Once a target device (for example 402) has received a file that has been shared with it, the received content may be displayed on the screen 204 of the device 402. The file may appear on the display 204 with some animated effected like a particle effect, and may be eventually displayed like it was in the preview mode of the sending device 201. The previewed received content item 1111 may have some visual indication of which device it was received from, such as colour coding the border of the received content with the colour that the device 402 uses to represent the sending device 201. The preview received content 1111 may appear on top of any other content (1112 and 1113) already displayed on the screen 204 as shown in FIG. 11.

If the receiving device 402 has received a number of files from a number of different source devices, the previewed content items (1111 to 1113) may stack up, but may also allow a portion of some or all of the received content items to remain visible for the user to interact with and select. In one example implementation, actions may only be performed on the top-most preview content item 1111, as indicated by it being the only content item with the user interface component 1120 appended to it for interacting with. Each of the stacked content items could provide some indication of origin by, for example, having colour coded borders relating to the colour of the visual representation of the other devices.

Presenting Content

In the previous section, methods have been described for sharing content with individual devices. These methods can be modified for sending to multiple devices (such as performing multi-touch gestures). However, there may be a need to easily present content to all the devices in a collaborative connected environment.

Figure 12A:
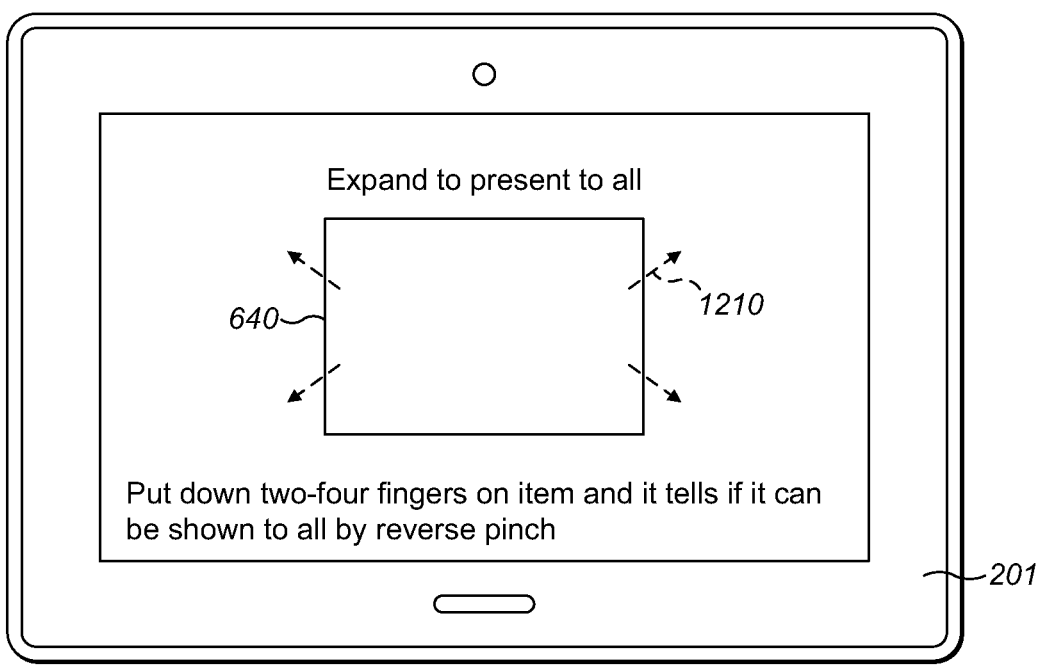
FIG. 12 illustrates a method of one electronic device presenting content to a number of electronic devices.

FIG. 12*a* illustrates a possible user input that can be used to indicate that the selected content item 640 on a device 201 should be presented to all the devices in a collaborative environment. The gesture 1210 used in this example is a two finger 'reverse pinch' gesture, expanding the content item to fill the screen 204 and therefore indicating that the user wishes for that content item to be shown on the displays of other devices.

The gesture need not be limited to a two finger 'reverse pinch', as the device 201 might allow for 'sloppy gestures' that are similar, but not as precise as the default, pre-defined gesture. For example, while the user is expected to perform a two finger 'reverse pinch' gesture to present content to all, the device 201 may interpret a 'reverse pinch' with more than two fingers as being an indicator by the user that they wish to present to all.

Colour coding can be used to indicate which device is currently presenting content on the receiving devices. This may be shown as a coloured border surrounding the content being displayed. While presenting to others devices, this can mean that the presentation "locks" the meeting app (or entire devices) in reception mode so they cannot do anything else but display the presentation. Or it can be a presentation mode where the devices can still be allowed to preview their own files and even share files with other devices in a new "layer" on top of the presentation, which then acts more like a wallpaper.

Figure 12B:
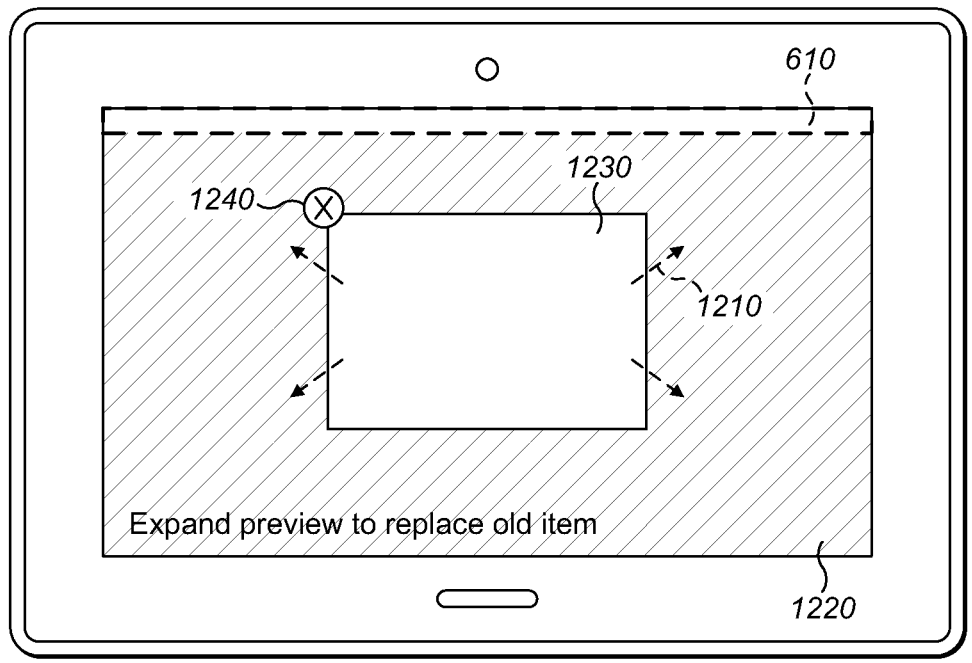

FIG. 12*b* shows a device 201 in presentation mode, with the presented content 1220 filling up most of the screen 204. The user may subsequently choose to change the content that is being presented in the same way that audience members can. The user may select another content item 1230 from the device's app menu 610. This content item 1230 is displayed on top of the presented content 1220 so the user can preview the new content 1230 before making a decision of what to do with it. The user may discard the content item 1230 by selecting the user interface component 1240, or may choose to perform another expand gesture 1210 to present the new content item 1230 to all devices in the connected environment instead of the currently presented content item 1220.

If the content being presented contains multiple pages, a sideways swiping gesture may be interpreted as indicating a page turn by the device 201, and on reaching the last page (or if there is only one page), the device 201 might present the next file in the list of files brought to the meeting.

Figure 12C:
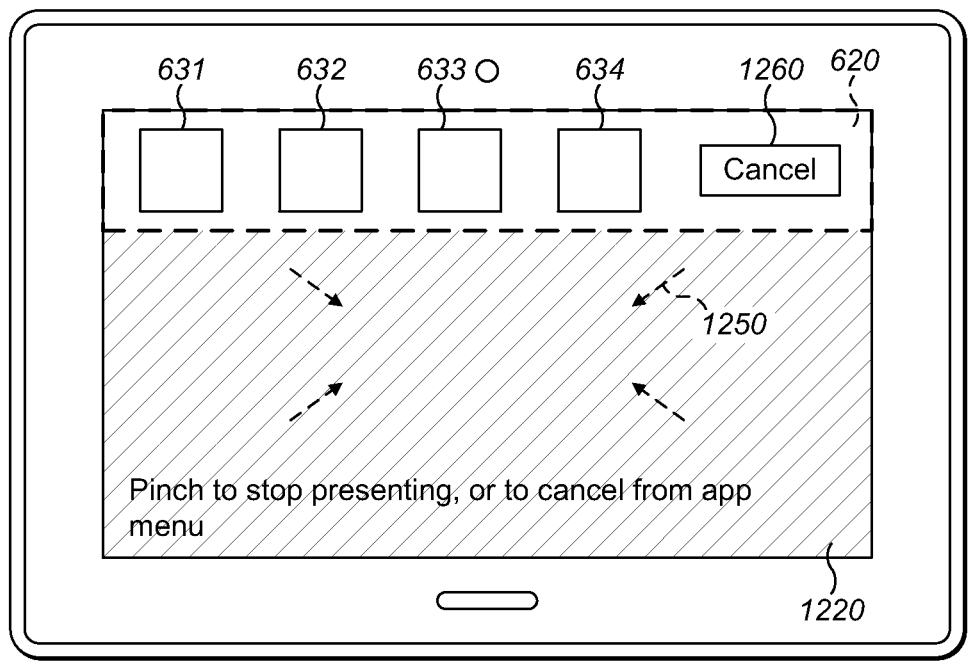

The user may choose to cancel the presentation by performing some user input. This user input may be a pinch gesture 1250 as shown in FIG. 12*c*, where the user 'pinches' the full screened presented content item to make it smaller and therefore indicate that it should not be presented to all. There could also be a dedicated user interface component such as a 'cancel' button 1260 for cancelling the presentation, which may be displayed on the app menu 620.

Figure 13:
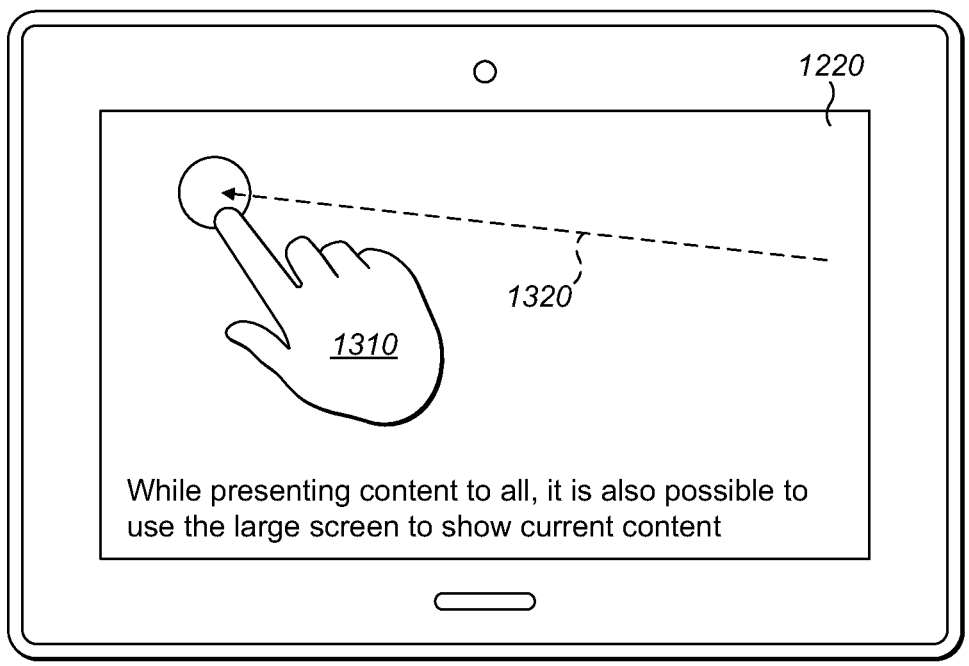
FIG. 13 illustrates one way of displaying the content of one electronic device on a larger screen.

While presenting content to all, the user may wish to present the content, not just to the devices in the collaborative environment, but also to a traditional display such as a large screen (not shown) or projector (not shown) that does not have access to information about the relative positions of the other devices. The user's device 201 may be aware of the position of the large screen and so the user can perform a certain gesture, such as the large gesture 1310 sweeping across the screen 204 in the direction 1320 of the large screen), as shown in FIG. 13. Alternatively, it could be the default behaviour for the large screen to automatically be included in the meeting during a 'present to all' mode, without the need for an additional gesture by the user.

When content is being displayed on all devices, the originator of that content is the "presenter". If another user tries to display content to all on their device, there may be a control mechanism which instructs the user to wait for the current presenter to finish presenting.

Proximity-based Collaboration Mode

While there may be a large number of devices in a given collaborative environment, there may also be a need for smaller groups of devices within this environment to collaborate with one another, differently from other devices in the environment. For example, in a meeting of different teams, while all the teams are within the collaborative environment and so can share content with everyone else in the environment 'publicly', it may be beneficial for the users to perform different collaborative actions that the users may wish to remain private within their own team. As teams will often be placed in closer proximity to one another than members of separate teams, one way of determining the sub-groups in the collaborative environment can be based on the proximity of devices.

Figure 14A:
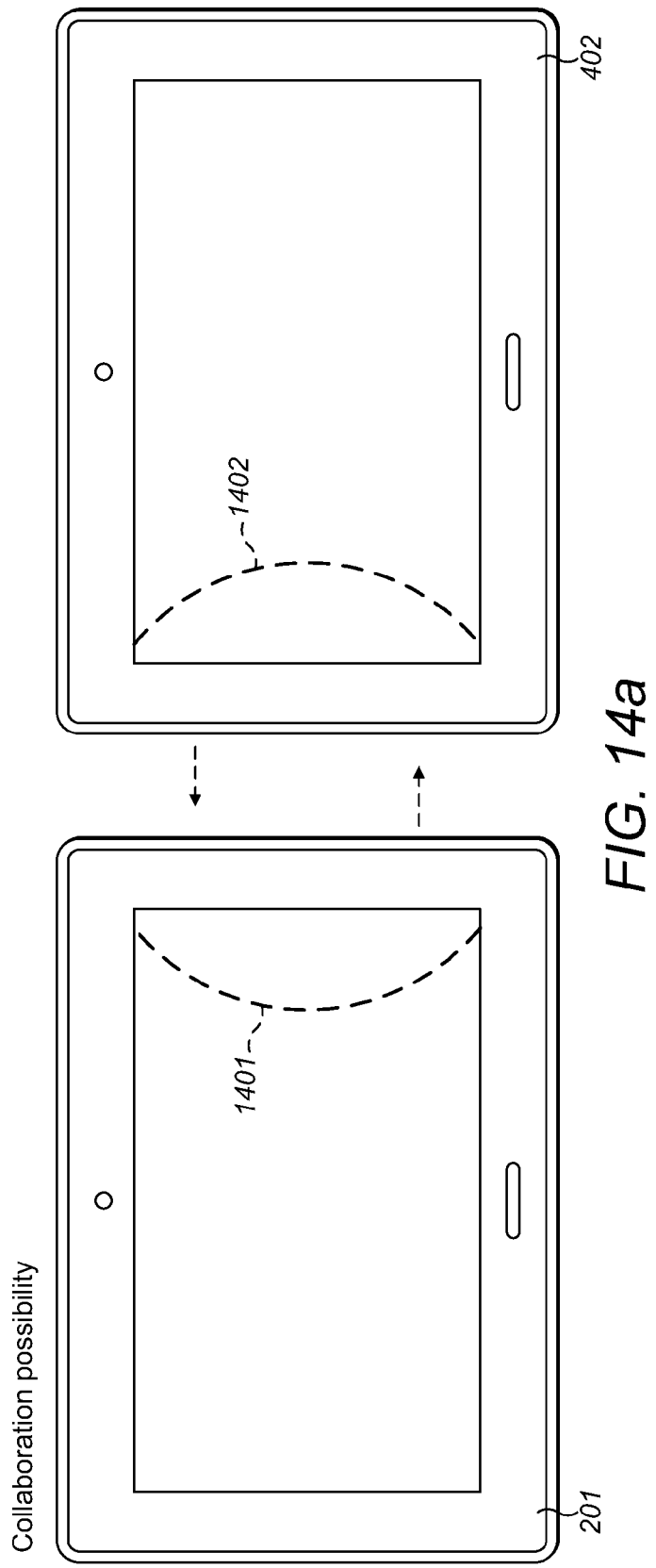
FIG. 14 illustrates a method of bringing two electronic devices into a collaboration mode by bringing them in proximity to one another.
Figure 14B:
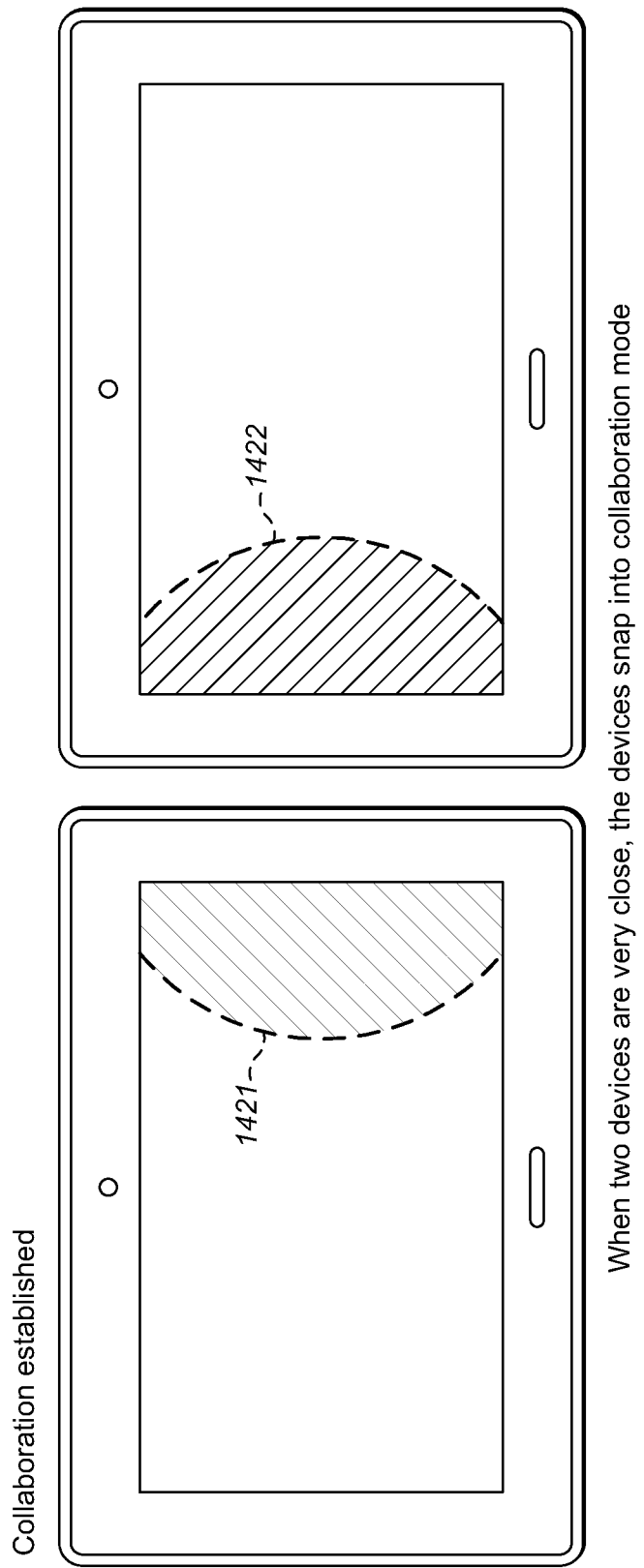

FIG. 14*a* and FIG. 14*b* illustrate one way of initializing this new connection within a collaborative environment. When two devices 201 and 402 are brought closer together, beyond a certain threshold distance, some indication may be provided to indicate that a separate or additional connection may be possible. This indication may be a visual indication, like having parts of a large circle appearing (1401 and 1402) on the displays of the devices. This indication may appear stronger as the devices are brought even closer together(for example, by increasing the opacity) until they are close enough for the devices to have passed another threshold distance and therefore 'snap' into a collaboration mode as show in FIG. 14*b*. Here the visual indication has changed (1421 and 1422) to indicate that the devices are now connected to one another in a new connection.

The connection may occur automatically when the two devices are brought close enough, or user input may be required at one or more of the participating devices before the connection is actually established. A user can choose to opt out of automatic connections by applying a relevant setting to their device.

This new connection could be a new communication channel established over a new or existing connection. For example, the additional channel could be a VPN tunnel or other secure channel over an established or a new WIFI or Bluetooth communication channel. Alternatively, the new connection could be a communication channel that is separate from the existing communication channel and of the same or a different type. For example if a Wifi communication channel is used to connect all of the devices, a Bluetooth communication channel could be used for the new connection between the devices in close proximity. The reverse scenario is also possible. Other implementations are possible as well.

Once connected with this new connection, the devices may be able to communicate privately with one another without the rest of the devices in the collaborative environment being aware of what the users of the devices within the new connection are doing. This privacy may be achieved by using a network or technology for the new channel that is different from that used for the existing channel, or if the same network or technology is used by securing the new communication channel by cryptographic means (e.g. VPN tunnel over WiFi). Once in a new connection, the devices connected via the new channel or connection may actually be shielded from communication from other devices.

Either or both the first and second communication channels could be established separately by known techniques or by 'tapping' devices to be connected and using for example an NFC subsystem (such as described above) to exchange connection (and if appropriate, encryption parameters) to help automate the establishment of the channels over for example WiFi or Bluetooth or other appropriate networks or technologies.

The new connection may allow for even closer collaboration by enabling the devices to work with each other as though they were a single, larger device. For example, by 'snapping' or 'tapping' (if NFC is used to establish either one or both channels) two devices together by bringing them close enough, they may start sharing one another's displays so that content can be spread across and interacted with on both displays. This would be similar to the situation illustrated in FIG. 17 (and which will be discussed in a different context later).

While the idea of proximity is used for entering an overall collaborative environment (e.g. devices being located in the same meeting room), this example shows how another level of proximity can be used, where when devices are brought especially close together, new behaviours are allowed.

Quitting and Cancelling

Figure 15:
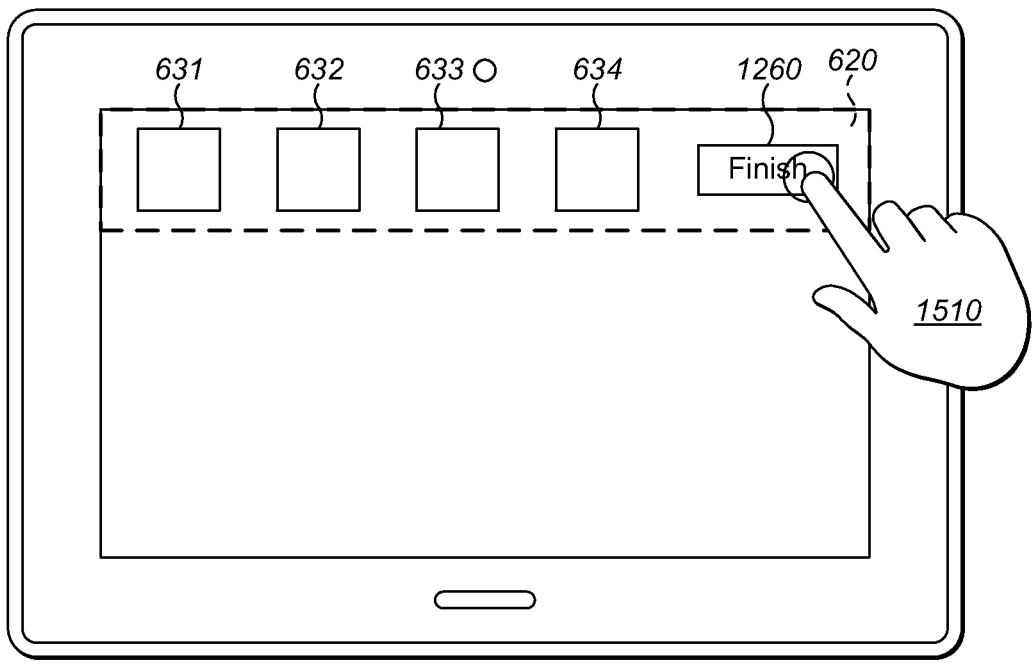
FIG. 15 illustrates an electronic device cancelling a meeting.

At any time during a meeting, the meeting can be terminated by the person who initiated it. This may be done by performing a gesture such as a press 1510 on a user interface component, like the "Finish" button 1260 of the app menu 620 as illustrated in FIG. 15.

Figure 16:
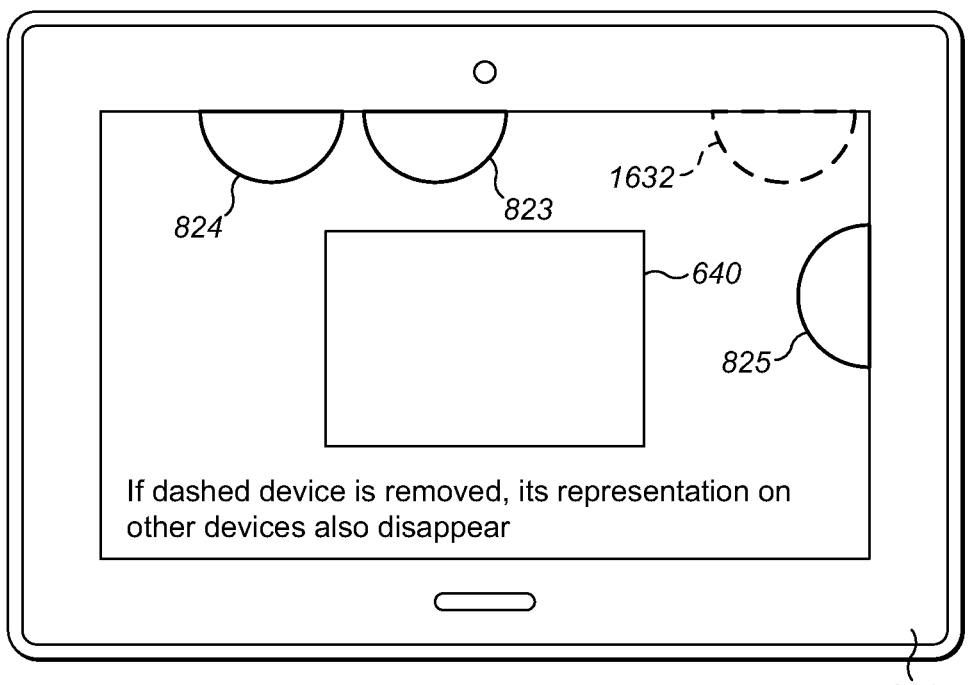
FIG. 16 illustrates the effect of removing an electronic device from the connected environment.

Individual devices may leave the meeting while it is still in progress. This may either happen intentionally, for example by the user of the device providing a user input indicating that they wish to leave the meeting, or unintentionally, such as if a device loses connection or moves out of range of the position-detecting means. When a device does leave the collaborative environment, an indication may be provided to the other users as illustrated in FIG. 16. This indication may be in the form of a visual indication 1632 on the visual representation associated with the leaving device, such as a particle dissolve effect or a fade out effect.

When a device does move out of range or stop being detected by a position-detecting means, it may not have been intentional, as the view of the device may have been temporarily obstructed by another object (such as a person blocking the view between the camera 410 and the device 201). It may not be desirable to cause a device to leave the meeting every time this happens. So instead, when the device's position can no longer be determined, the last known position could be used, and the other devices can be sent data indicating that the device's location cannot currently be determined (for example, by displaying an icon over the graphical representation of the device). If a device is still connected to the collaborative environment but cannot be viewed by the position-determining means, it may not be considered to have left the meeting.

Common Displays

With access to the devices' relative positions, it is possible to create a "mosaic" of interconnected devices. This enables screens of the interconnected devices to behave as if they are part of a single larger space, making it possible for connection and interaction opportunities between devices to be clearer to the user.

Figure 17:
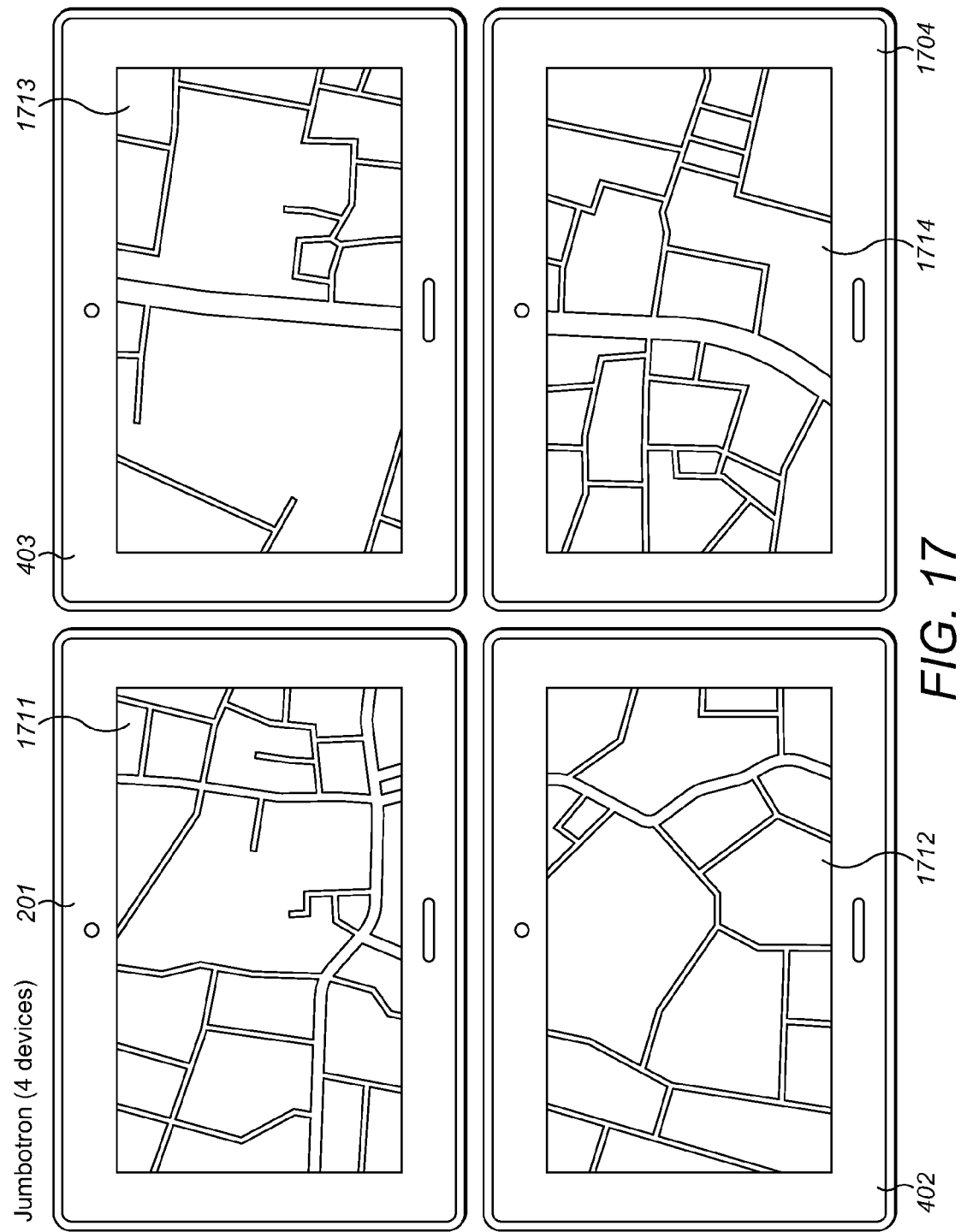
FIG. 17 shows a number of electronic devices working together to display a single piece of content across multiple displays.

An example of such an effect is shown in FIG. 17, where four separate device (201, 401, 402 and 1704) are connected within the same connected environment and are aware of their relative positions and orientations to one another. It is therefore possible for one large image (for example the map of FIG. 17) to be spread across the separate screen (1711, 1712, 1713, 1714) of the individual devices. While such an effect can be useful for turning a few small screens into one larger screen the effect can be further utilised to be even more useful.

One portion of the large image could be interacted with through user input on one of the screens (1711, for example), and this would have an effect on the whole image across the displays. For example one of the devices could receive a pinch gesture on the screen 1711 to indicate zooming in, and this would result in the large image as a whole zooming in, with the change showing on all the screens. Or the screen 1711 could receive a scrolling gesture resulting in the entire large image scrolling on all the screens. Therefore the collections of screens would not only be acting as one large screen for displaying content, but also acting as one large device that can accept user input over a greater area than a single device, and could share other resources like processing power.

The concept of using the individual screens 204 of the devices 201 to display portions of a much larger image can be modified to provide further functionality. Rather than displaying portions of a larger image, the device could display portions of a larger virtual surface (such as an interactive whiteboard) and therefore be part of a much larger user interface. Each of the devices may be able to place content on this shared, virtual surface, for example, by 'dropping' a file onto the part of the surface that the device 201 is currently positioned or by creating content directly on the virtual surface, for example, by drawing or typing onto it. Once a file is 'dropped', if the user moves the device 201 away, the screen 204 will no loner display the dropped file, but if the user moves the device 201 back to the same physical position, it will display the file on the screen 204 again. This feature becomes more useful when other devices are involved, as once a first device 201 drops a file onto the virtual surface and moves away, another device 402 can be moved over the same area and then can view that dropped file. The user of the other device 402 can now interact with that item by interacting with its representation on the device's screen. The file may, for example, be a memo that a first user created, or any other file that a user wishes to share with the users of the collaborative environment. The dropped file or content may be accessible to all users in the collaborative environment or may be private to a subset of users (including only one of them).

The content or file that is placed on this virtual surface may be inherently linked with a position on the virtual surface. If the collaborating devices are all moved to another physical location (for example another meeting room) and they load up the same, saved virtual surface, the devices would act as though they were in the same location, and the positions of content placed on the virtual surface would be the same relative to the starting positions of the devices or some other predetermined reference point (like the external camera 410 position). The content placed may have related meta data associated with it, such as the application used for creation, time of creation, or the context or state of that application.

Once a device 201 has moved away from the location of the content it will no longer be visible on the device's screen 204 and so it might be difficult for a user to locate the content again, other than by randomly moving the device around until the content appears. Therefore, navigational hints as to where the content has been placed may be visible to all members of the session (or whichever users have authorisation to view and interact with it), for example in the form of an arrow pointing towards the relative position of the content on the virtual surface that will change as the user moves the device so it always points at the correct location.

There is a finite amount of screen real estate available on the displays 204 of electronic devices 201 and therefore there is a need to efficiently use this space. In order for devices to know whether they are connected to one another or not, some kind of connection icon could be used. However, such status icons use up screen space that could otherwise be used for other user interface components. There are also a number of factors that may need to be communicated to the user that may not all be containable within a single, small icon.

Figure 18A:
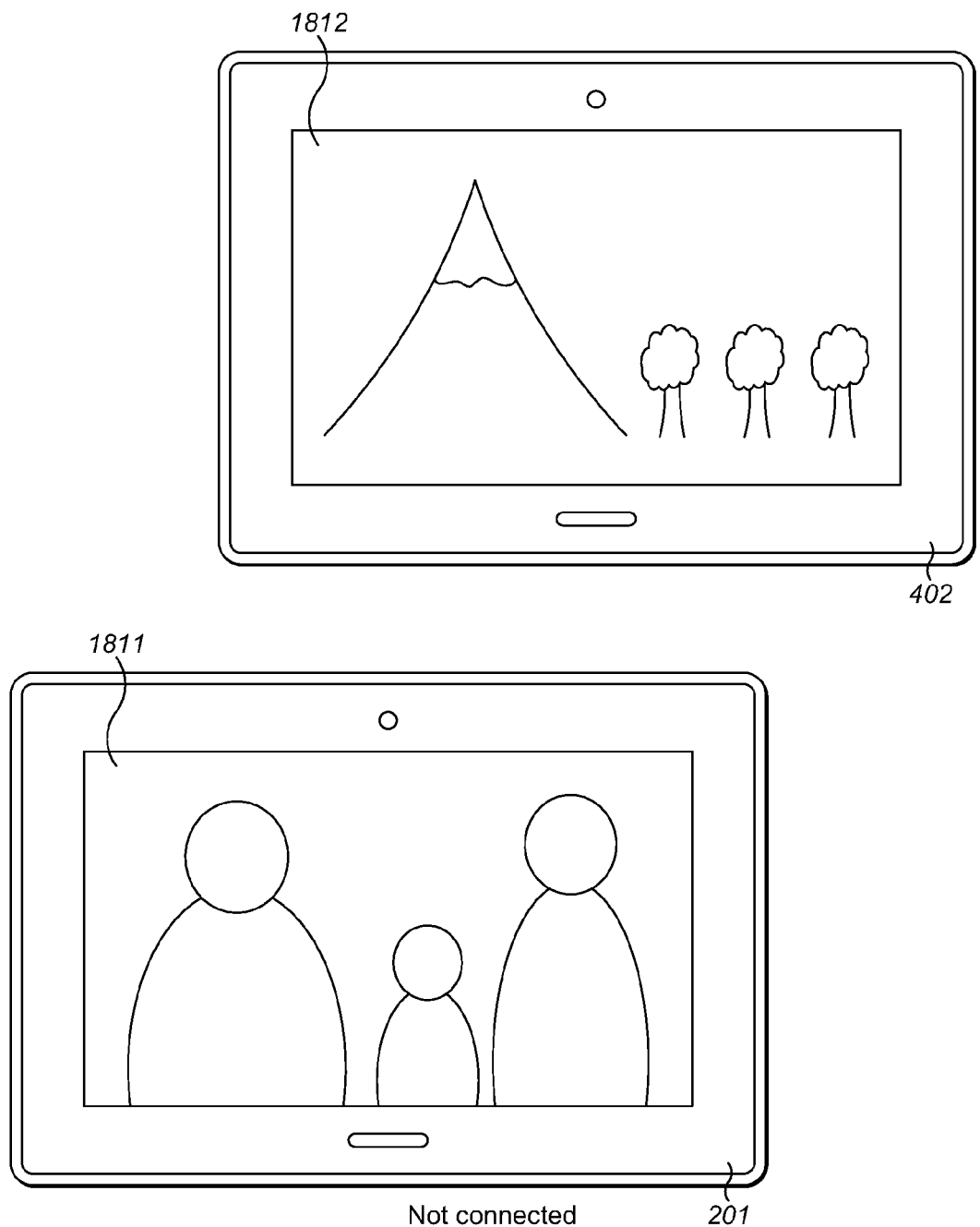
FIG. 18 illustrates a method of indicating that two or more devices are in a connected mode through the use of live wallpapers.
Figure 18B:
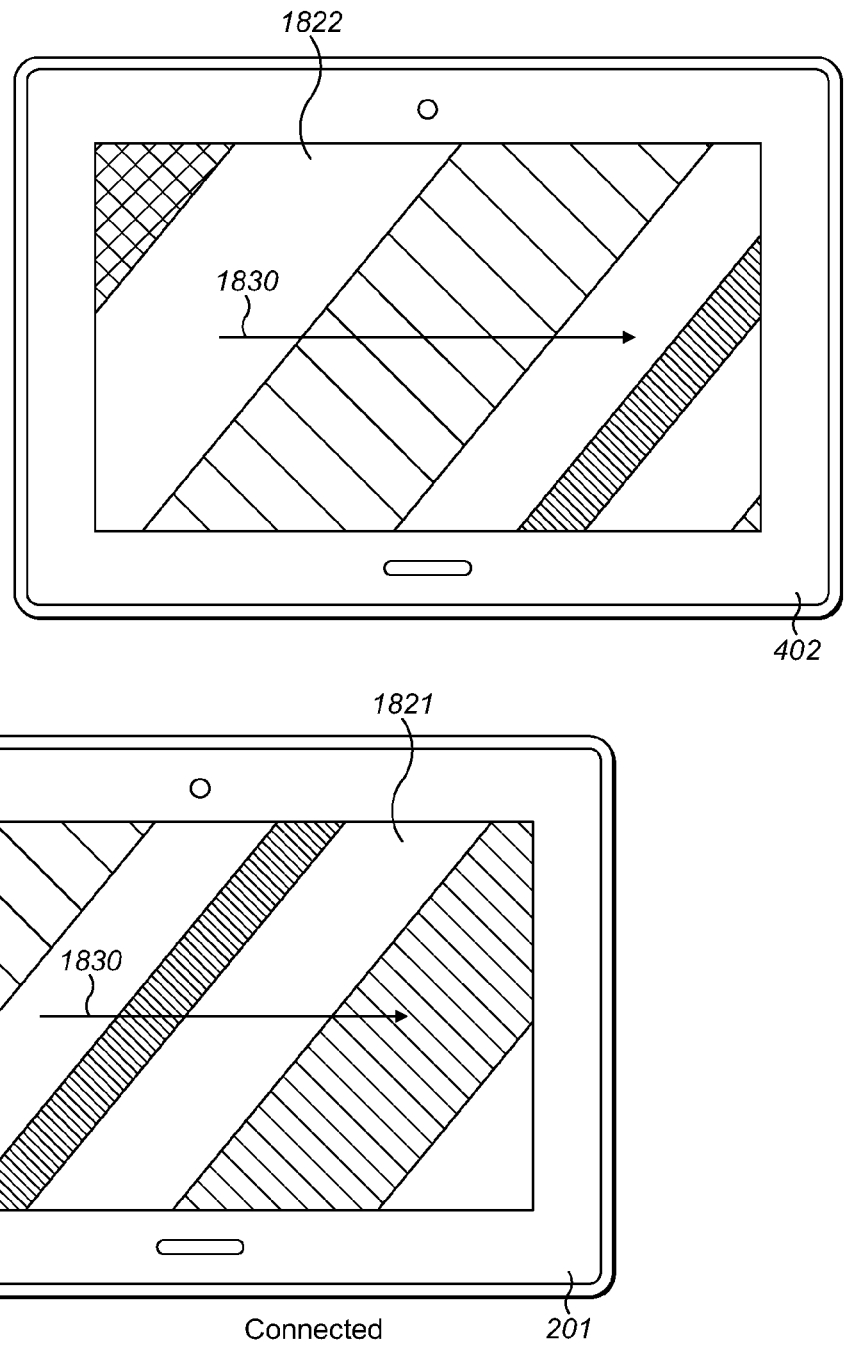

One proposed solution is to use a live-wallpaper'. When the user devices (201 and 402) are not connected to one another (as shown in FIG. 18a), the wallpapers (1811 and 1812) are simply images or animations selected by the user. It could be personal, downloaded or preinstalled wallpapers. But when two devices connect to each other (as shown in FIG. 18b) the wallpapers that were originally independent of each other on the two devices, transition into one connected live wallpaper. The new wallpaper is not simply two wallpapers displayed on two devices, but one large wallpaper displayed over the two devices. This indicates to the user that a connection between the two devices has been made. By changing one visual factor (the wallpaper) on both the connecting devices the user can also see which two devices are connected. Additionally, within the wallpaper, data such as connection speed and location can be displayed using colour changes and animations, for example.

The way the live wallpaper is spread across the two devices to appear like two separate wallpapers (1821 and 1822), can be determined by the orientations of the two devices and their relative positions, including the spatial separation between them. Animating the live wallpaper (for example, as an equivalent translational movement 1830) makes it clearer to the users that the two devices are connected and that it is not mere coincidence that their wallpapers appear to match up at that moment.

Particle Systems

There is a need to provide users with information regarding the different states of the communication and connections (for example the communications channels and connections described above as well as content sent and received using those connections) in such a way that it is understandable to the user, and allows the user to efficiently act on the information. One possibility is to use detailed text information to describe the communication and connection characteristics, however this may difficult to understand for the average user.

One proposed solution suggests a user interface representation that efficiently captures the abstract nature of one or many devices connecting, sharing data, or communicating with each other or remote servers, while still being able to carry detailed information to describe the characteristics of the communication and connections.

This representation may be built around a particle system structure. The representation may, by its nature, not be static (for example it can change form and move), and is normally not deterministic although it can be used in a deterministic way to represent certain objects (for example an image that is dissolved and then has the process reversed again).

The particle system may consist of a large set of individual particles, where each of the particles has attributes like initial position and velocity, size, color, shape, lifetime, transparency, glow etc. These attributes together with intensity, gravity, friction etc. can be combined in a number of different ways and set to communicate connection characteristics to provide continuous visual feedback on things as for example:

- Bandwidth (such as the transfer rate or number of packets sent or received);
- Quality (for example number of errors or quality of service) of the connection;
- Type of connection (for example Bluetooth, Wifi, cable, mobile network etc.) and its signal strength;
- Physical characteristics such as the physical locations (for example orientation and distance) of the sending and receiving devices;
- Progress indication, if there is transfer in progress and also type of transfer (copy, move). In this case the particle system emitter and attractor could be a representation of the object being transferred.

The particles themselves can represent content or characteristics in different ways. The particles could provide a 'direct' representation, where the particles are actually derived from the content itself. For example, where the particle system is related to an image (such as the transfer progress of an image), the particles themselves can be fragments of that image in the form of dissolved pixels or polygons. The particles could provide a 'symbolic' representation, where the particle system is related to certain content (like an image), but the particles themselves have no visual connection to the content. For example, even if the content is an image, the particles themselves could be made up of abstract pixels or geometric shapes that have no visual relation to the image. The particles could also represent additional 'meta data', for example battery level, signal strength, connection speeds or user alerts. As meta data is not content, but more an abstract concept, they do not have any tangible visual properties for the particles representing them to be based on. However, the particles can still represent the meta data, either through an entirely abstract representation (like a simple collection of pixels used to represent connection speeds) or through a more logical representation (like a collection of electron-like particles with 'sparking' visual effects to represent battery level).

The device may have stored in its memory one or more algorithms that are related to models for particle systems. These particle systems may be based on known physical laws (such as simple ones like gravity or more complex ones like ones based on fluid dynamics), or they may have no basis on existing physical laws at all. These algorithms and models may have system parameters that determine the behaviour of the particle systems that they generate, such as the rate of particle generation, particle lifespan, particle mass, terminal velocity, viscosity and so on. A characteristic (such as signal strength) can be mapped onto one of these parameters, such that every time the signal strength changes, one of the parameters of the particle system changes as well.

The device can then perform a simulation of the particle system (determining the properties of each of the particles such as coordinates) and then render them so that they show on the display in the right position with the right appearance. The device could simulate an entire particle system independent of characteristics being measured and when it renders the particles, takes into account the characteristics being monitored. The device may calculate each step of the simulation at regular intervals, or simulate the next step only once it has received a status update of the monitored characteristic. The regular intervals could be frequent enough for the particle stream to appear to be being updated continuously (ideally higher than 24 updates per second or the refresh rate of the screen 204).

A single device can perform the simulation and rendering before transmitting any relevant data to display the particle system, or each device involved can share the workload and simulate and render different parts, particularly the parts of the particle stream that will be displaying on their respective screens.

Figure 19A:
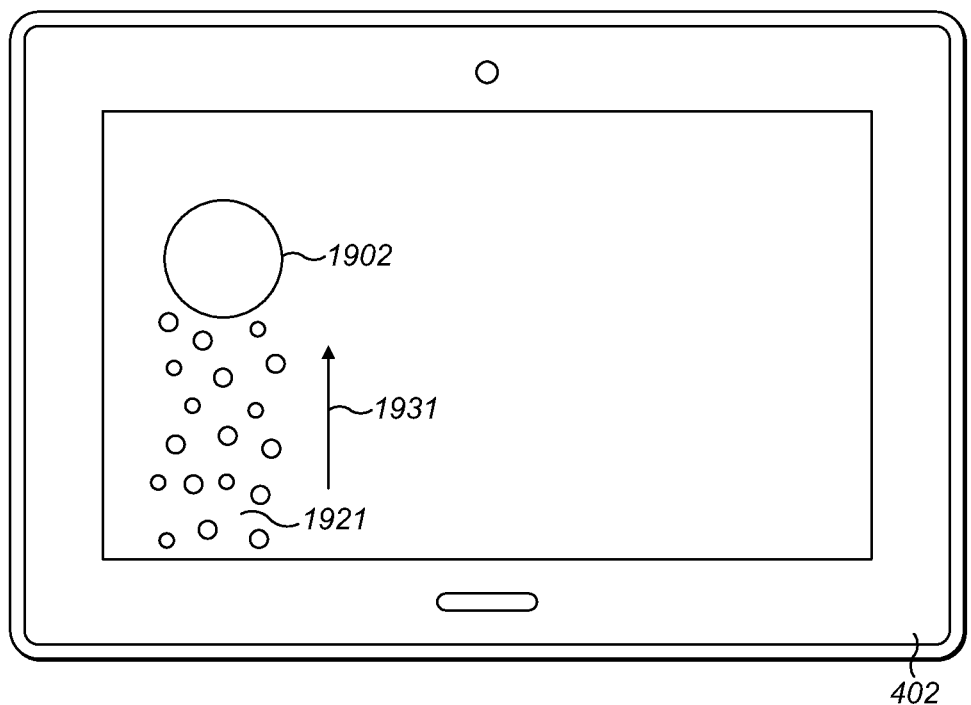
FIG. 19 illustrates a number of ways that particle effects can be used to indicate the status of characteristics of a connection of an electronic device.
Figure 19A:
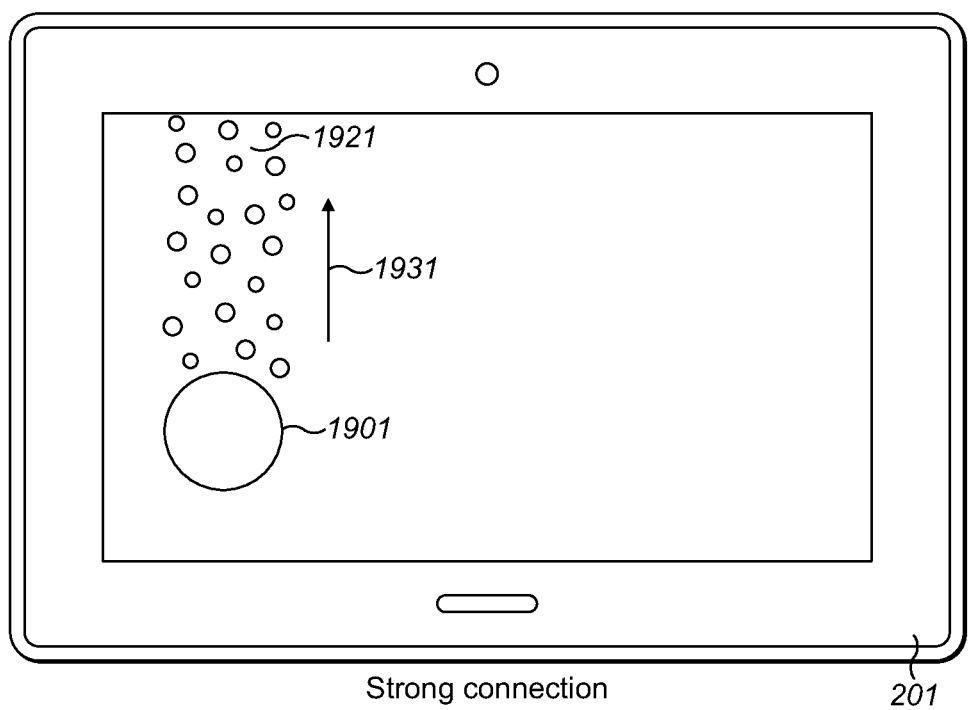
Figure 19B:
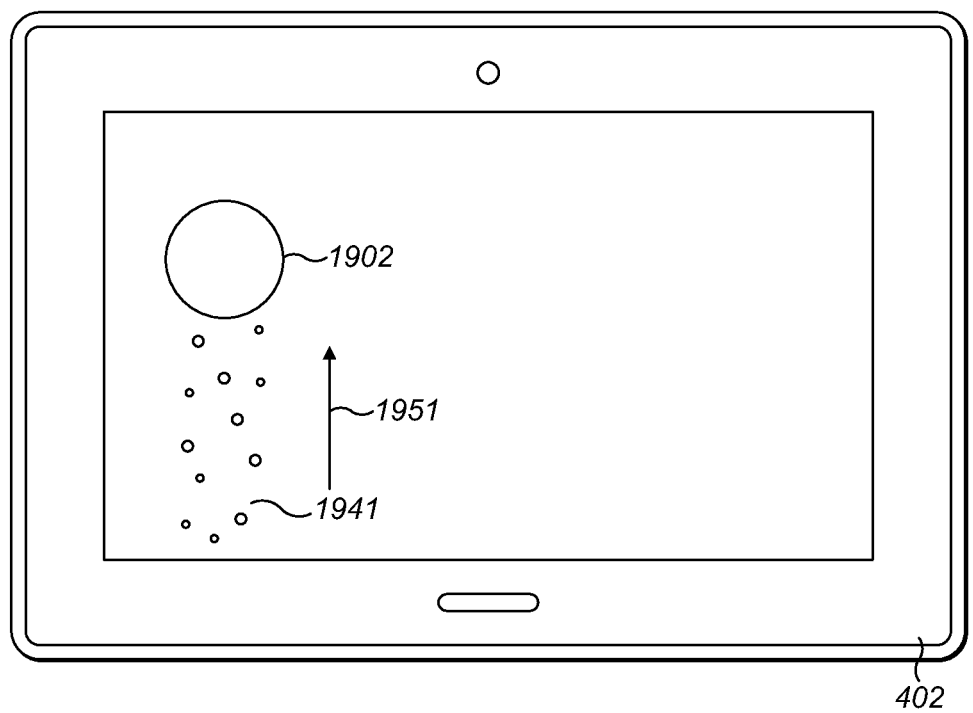
Figure 19B:
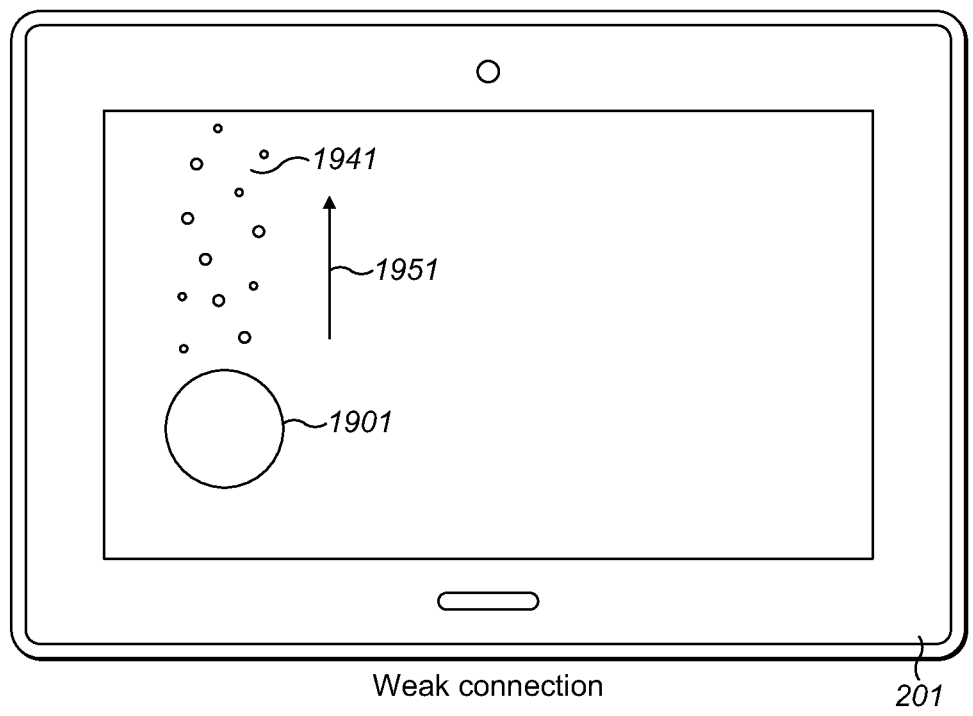

As illustrated in FIG. 19a and FIG. 19b, an example implementation uses a particle system to illustrate the current strength of a connection. It can do this by altering the particle intensity (velocity and number of particles spawned) in accordance with the strength of the connection. In FIG. 19a, a device 201 is in connection with another device 402 and the signal strength can be indicate by a particle stream 1921 displayed on the two devices. This stream may be flowing 1931 in a certain direction, but as in this example the characteristic being represented is signal strength, it does not matter what direction the flow is. However it may still be advantageous for them to flow in the same direction on both devices to provide visual reinforcement that the two devices are connected. In this example, the particles are shown to be sent from a visual representation of an emitter 1901 and received at a visual representation of a receiver 1902 at the two devices.

FIG. 19b shows a similar setup to FIG. 19a, but here the signal strength is weaker. This is indicated to the user by the lower particle intensity 1941 (which can be achieved by a lower density of particles, smaller size of particles and slower speed of particle flow 1957), and it would be easily interpreted by the user as indicating a lower strength than that shown in FIG. 19a.

The above example shows a simple mapping of a single characteristic to a single parameter. However, much more complex mapping are possible. Multiple characteristics can be combined to map onto a single parameter (for example, particle emission rate could be mapped onto a function of both signal strength and bandwidth), or multiple parameters can be mapped to a characteristic according to different functions (for example, transfer speed may be linearly related to particle speed, but non-linearly related to particle size). The individual particles themselves may have individual properties mapped to certain characteristics, for example, although the particle stream speed as a whole could be mapped onto the transfer speed, the lifetimes of the individual particles within that stream could be mapped onto the individual data packets being transferred.

Figure 20A:
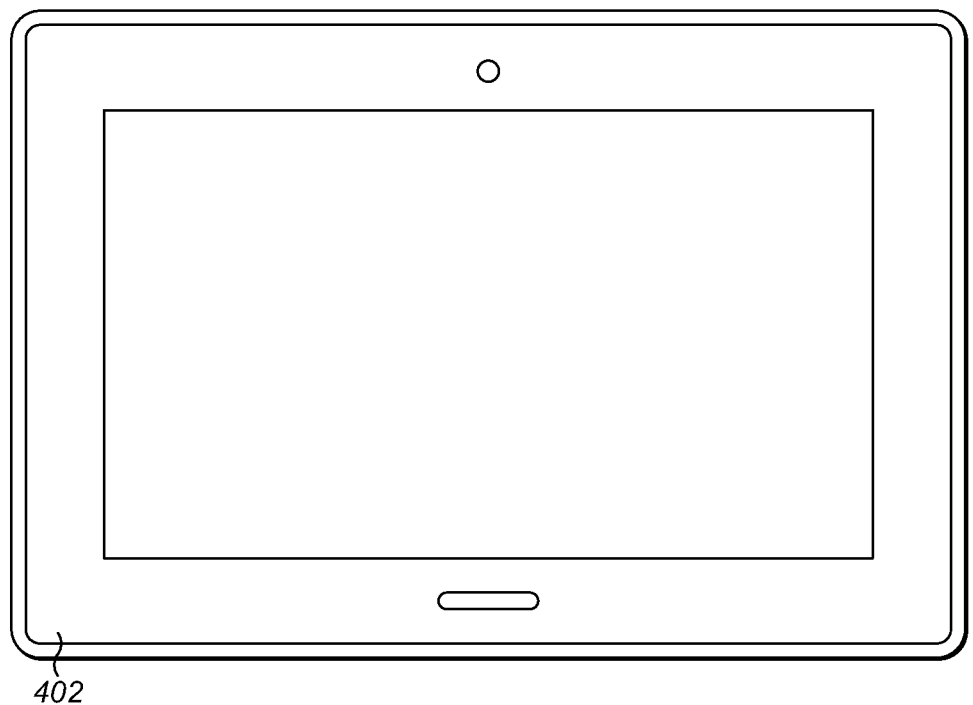
FIG. 20 illustrates the use of particle effects to indicate the transfer of data from one electronic device to another.
Figure 20A:
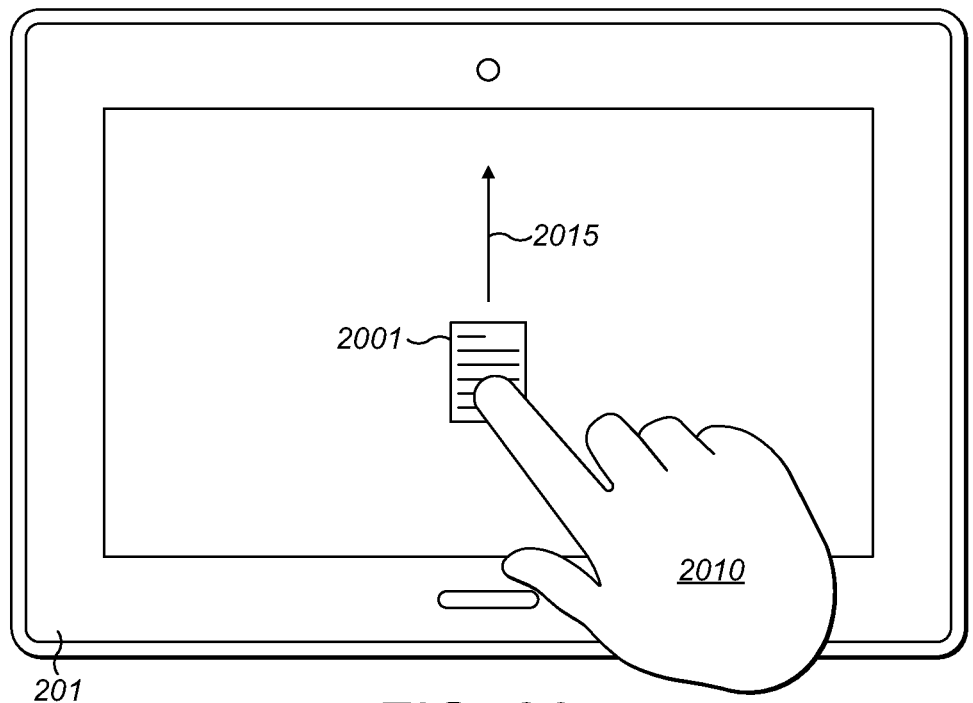
Figure 20B:
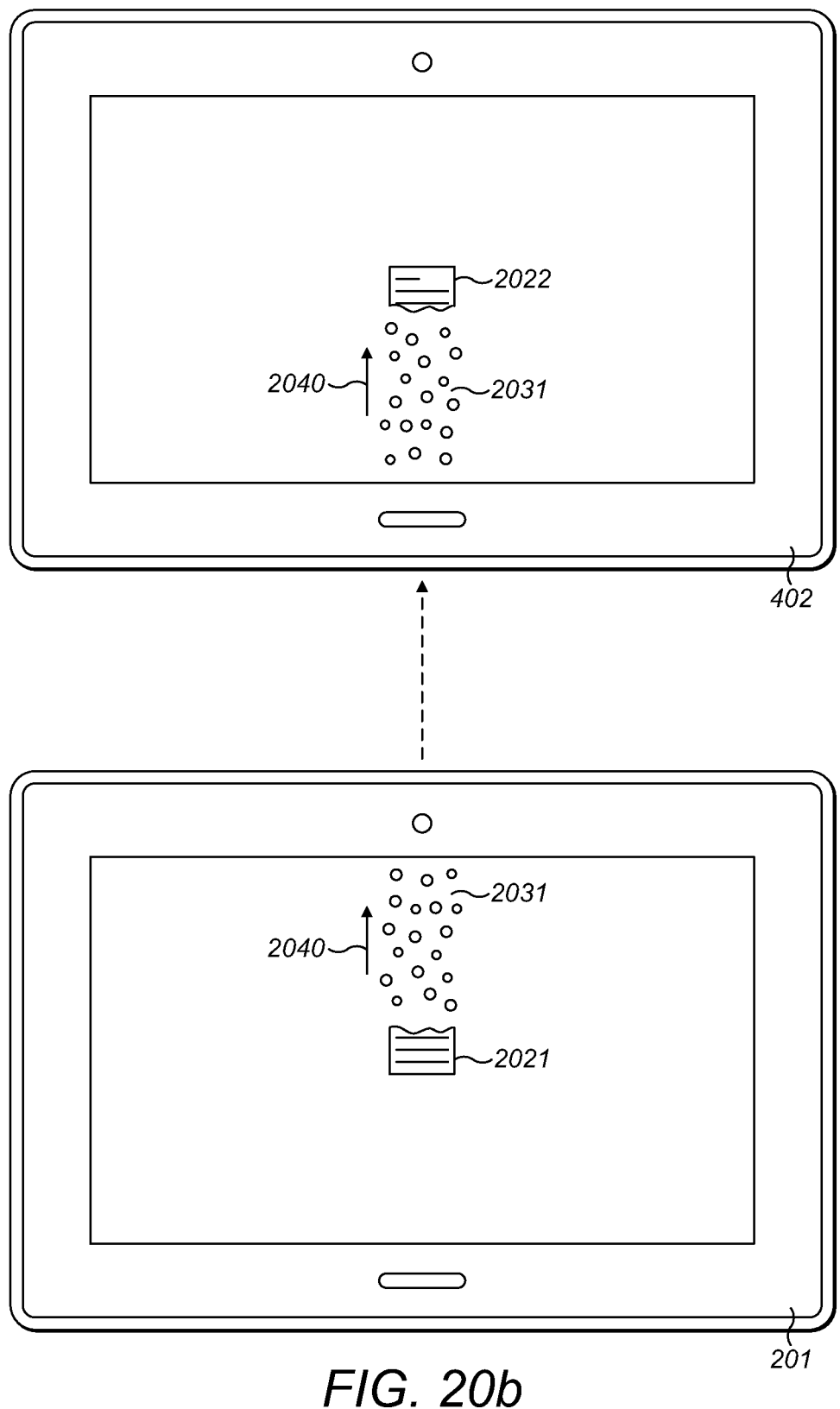
Figure 20C:
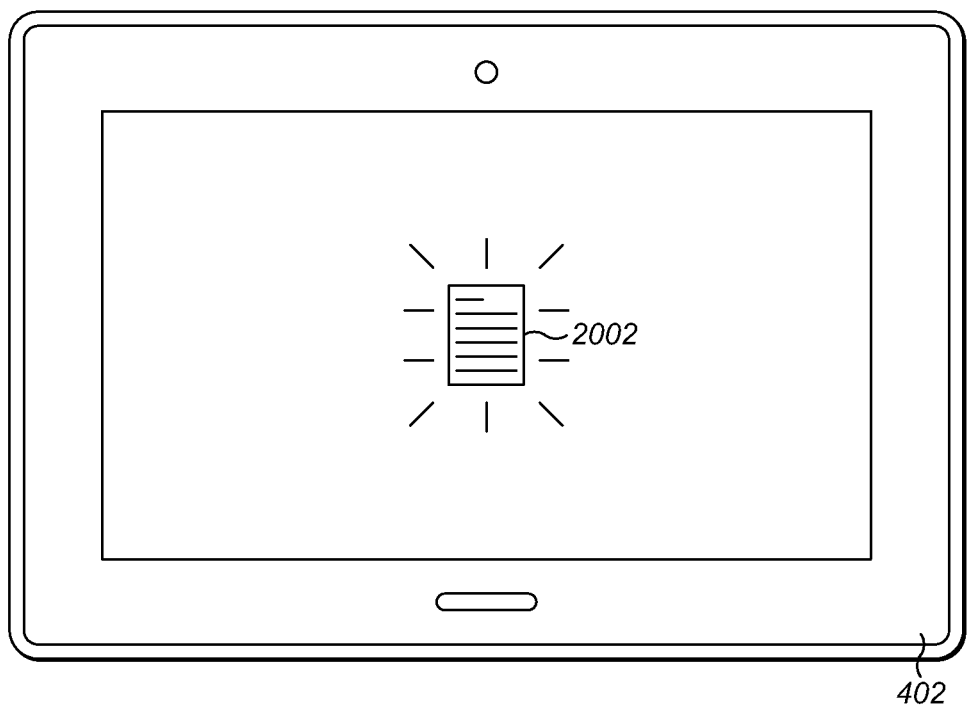
Figure 20C:
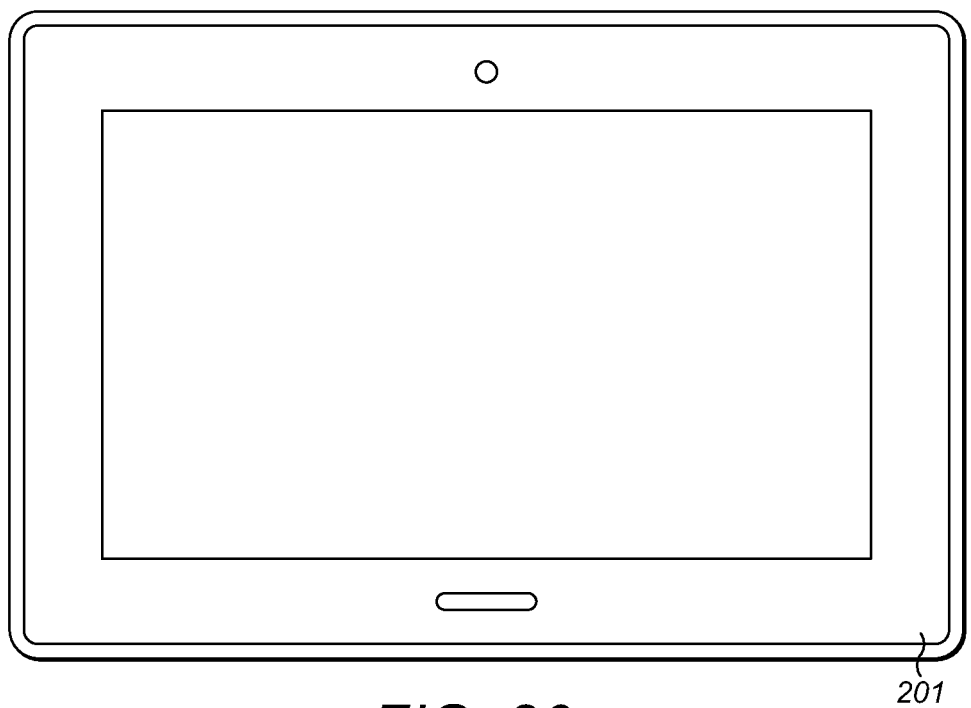

FIG. 20a to FIG. 20c show how particle effects can be used to indicate the status of a transfer of data. At FIG. 20a, a user wishes to transfer a file 2001 from their device 201 to another device 402 and does so by providing a user input to indicate this (in this example, by performing a drag 2010 in a direction 2015 towards the destination device 402). A particle stream 2031 may start to show the visual representation of the file breaking apart and, piece-by-piece, being sent to the destination device 402. The rate at which these particles flow 2040 may be determined by the transfer speed and an indication of how much has transferred can be shown by how much the original file remains 2021 and how much has successfully transferred 2022 (as shown in FIG. 20b). Over time, and once the transfer has completed, the fully transferred file 2002 will appear on the destination device 402 fully assembled as shown in FIG. 20c.

Figure 21A:
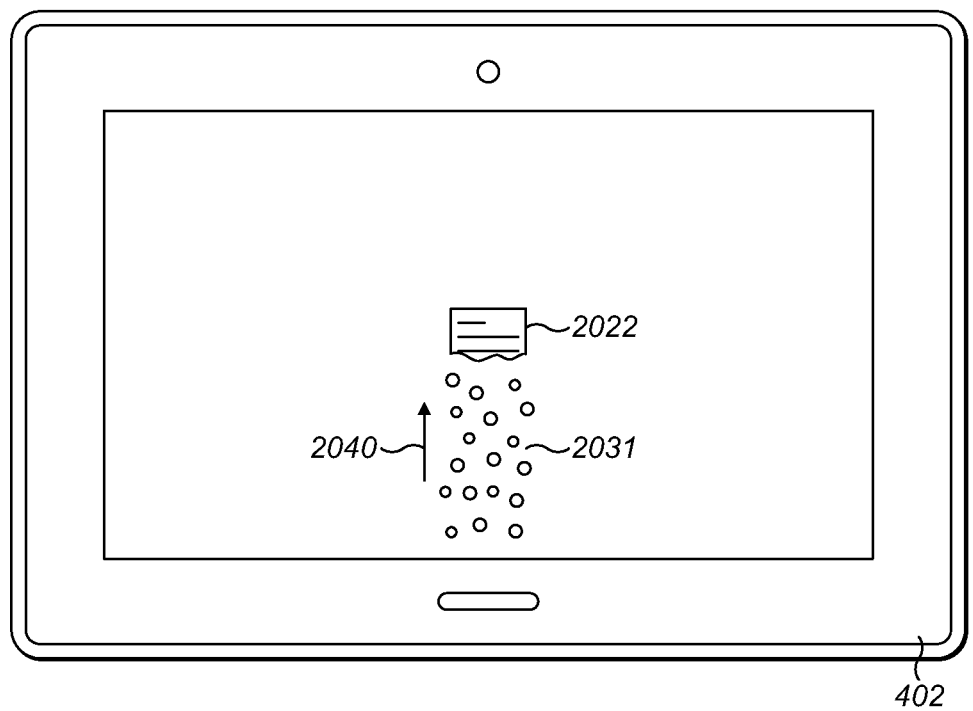
FIG. 21 illustrates a user interacting with a particle stream representing the transfer of data to affect the transfer of data.
Figure 21A:
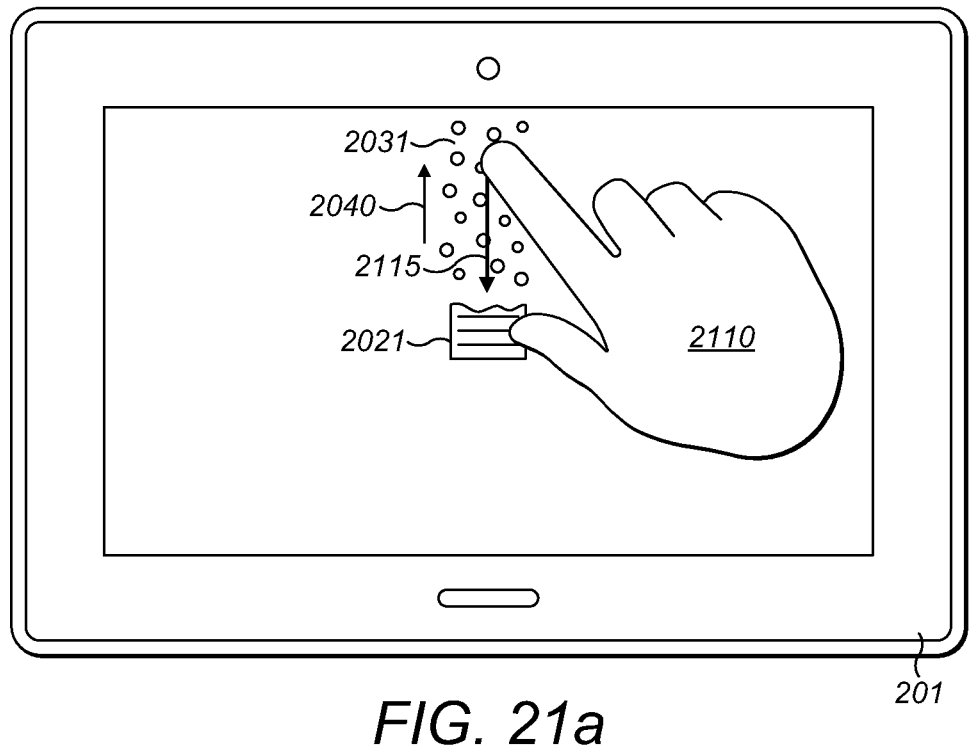
Figure 21B:
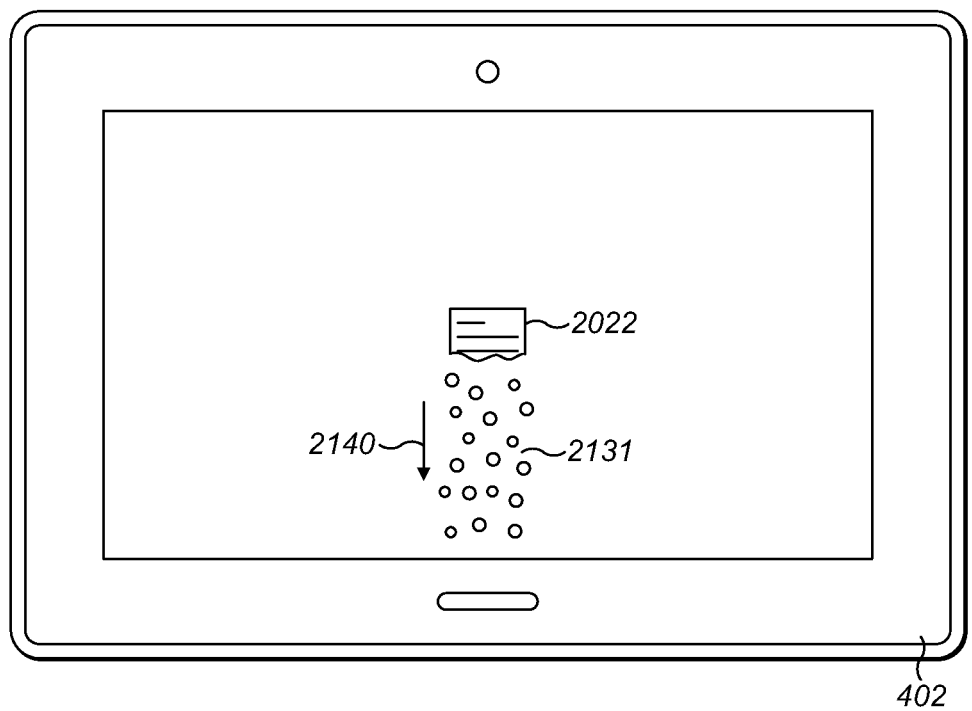
Figure 21B:
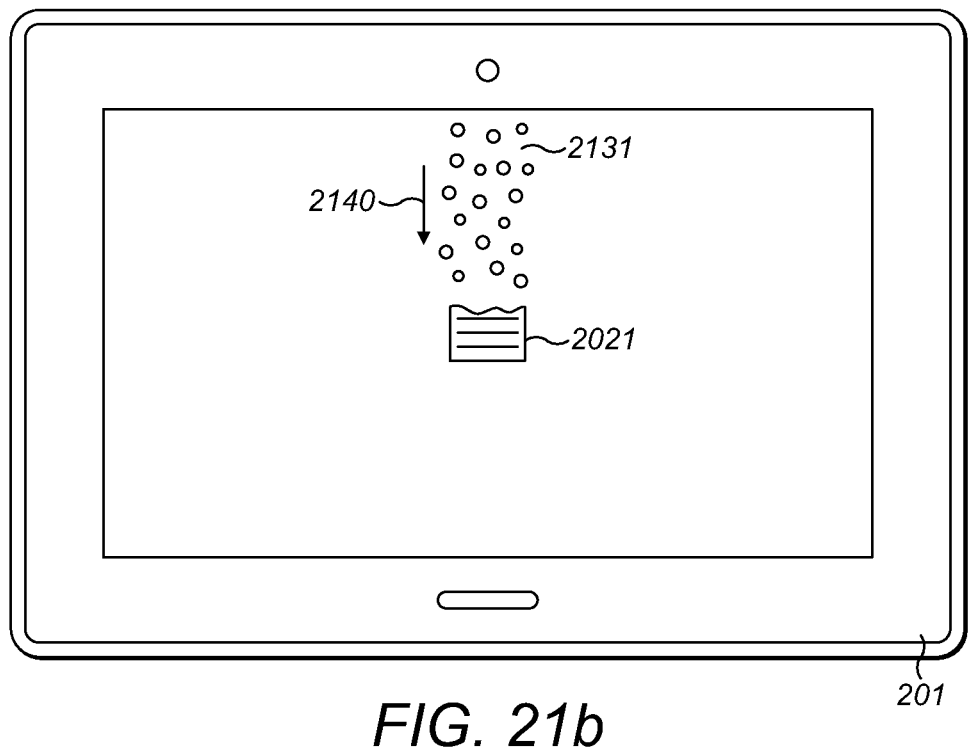
Figure 21C:
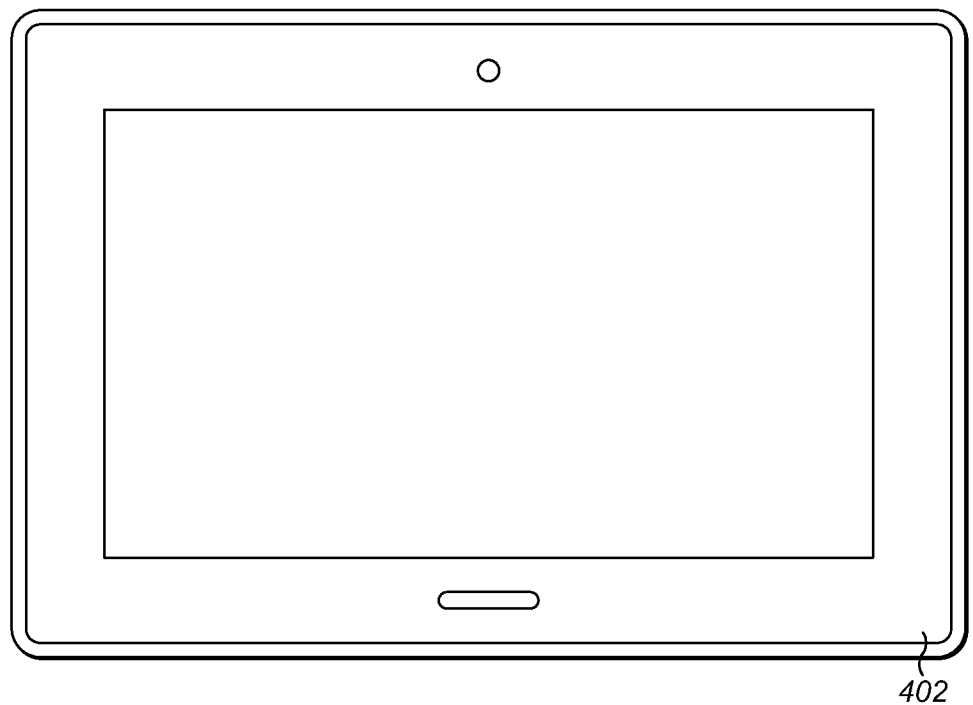
Figure 21C:
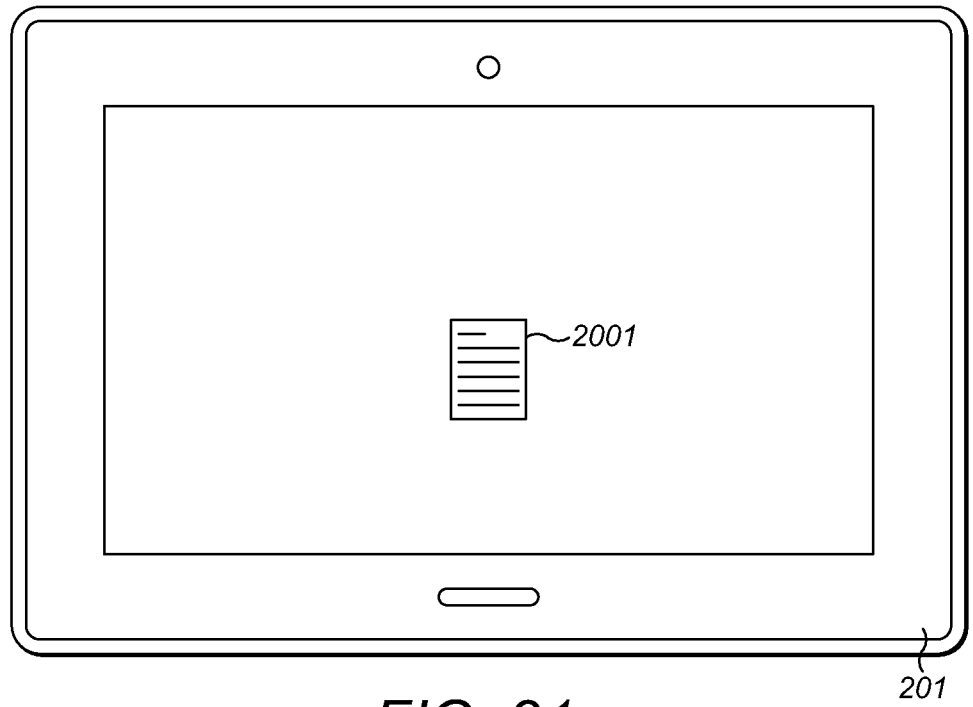

The particle stream could also be interacted with, thereby enabling the user to interact with whatever the particle stream is representing. For example, the user could swipe a finger across the particle stream to pause the transfer of data, or hold the finger on the stream to completely stop the transfer. In FIG. 21a the user can drag 2110 the particles in the opposite direction 2115 of the movement of particles to indicate cancelling a transfer. In FIG. 21b the direction of particle movement has now reversed 2140 and the flow of particles in the particle stream 2131 is in the opposite direction, indicating that the transfer is now reversing until the point where the partially transferred file 2022 is removed from the destination device 402 and instead remains solely on the sending device 201 as indicated in FIG. 21c.

Different gestures performed in relation to the particle stream could cause different effects. For example, a tap on the particle stream could display more details about what the particle system is representing. A swipe across could result in a pausing of a file transfer, whereas holding down could stop it. Another gesture could alter the speed of the transfer and performing a drag towards another destination could change the destination of the transfer.

While the activity that the particle stream is representing could be very fast or instantaneous, the particle stream itself may be displayed for longer, thereby introducing an artificial delay and giving the user a chance to provide user input to the stream even if the activity has already occurred. This could be useful in the case of file transfers, where a user is already used to the idea of performing a gesture on the particle stream to cancel the transfer, but in the case where the transfer is very quick, it may still appear to the user that the transfer is taking place, giving the opportunity to 'cancel' the transfer by performing the well known user input, when actually it would be undoing the transfer (though, to the user it would appear to be a cancel). This would mean the user does not have to be taught a separate gesture for undoing an action that has recently happened.

The example where a particle stream is used to indicate file transfer progress has many advantages over a simple progress bar. A progress bar provides only one dimension of information, namely percentage completed (but could arguably also indicate speed of progress by watching how it changes with time). However, because a particle stream contains a large number of particles, each with their own customisable properties, a lot more information can be provided to the user, while using the same amount of screen real estate. For example, if the transfer is taking place over a lossy connection, there may be a lot of data packets being lost and therefore resent; this could be shown in the particle stream by reducing the lifetime of some of the particles, some of which appear to drop away from the rest of the particles and fade out to indicate packet loss. In fact, each particle could represent a specific data packet being sent, and the properties of that data packet can also be represented in that individual particle. This could therefore provide a powerful and intuitive way of providing the user with information relating to slightly abstract concepts while minimising the amount of screen space used.

This versatile and compact representation using particles, which could be presented in a nonintrusive way, independent of the rest of the user interface can enable the user to, at a glance, directly understand the data and process, and take decisions about the ongoing activities in the device.

Embodiments have been described herein by way of example and these embodiments are not intended to be limiting. Rather, it is contemplated that some embodiments may be subject to variation or modification without departing from the spirit and scope of the described embodiments.

The invention claimed is:

1. An electronic device comprising:
an input interface for receiving user input;
a display;
one or more processors; and,
memory comprising instructions which when executed by one or more of the processors cause the electronic device to:
receive information indicating a current location of the electronic device relative to a location of at least one other electronic device from an imaging device located above the electronic device and the at least one other electronic device,
wherein the imaging device is in a device that is separate from the electronic device and the at least one other electronic device;
display on the display a representation of said at least one other electronic device and its relative location to the at least one other electronic device; and,
receive at said input interface a gesture in a direction from the relative location of the electronic device to the at least one other electronic device; and
in response to the gesture, establish a communication session with said at least one other electronic device.

2. An electronic device according to claim 1, wherein the instructions, when executed, cause the electronic device to receive updated information relating to the relative location of said at least one other electronic device.

3. An electronic device according to claim 1, wherein the instructions, when executed, cause the electronic device to detect the orientation of said electronic device and display said representation of said at least one other electronic device in dependence on said determined orientation.

4. The electronic device of claim 1, wherein the electronic device comprises a touch pad for detecting the user input.

5. The electronic device of claim 4, wherein the display is a display screen and the touch pad is provided as a touch-sensitive overlay on the display screen to provide a touch-sensitive screen.

6. The electronic device of claim 1, wherein the electronic device comprises a camera for detecting the user input.

7. The electronic device of claim 1, wherein the electronic device comprises a camera for capturing an image of a reference pattern and wherein the electronic device is adapted to receive another image of said reference pattern and to compare said received image with said captured image for determining said current relative location of said at least one other electronic device.

8. The electronic device of claim 1, wherein the electronic device comprises a sound detector for detecting sound signals received from said at least one other electronic device.

9. The electronic device of claim 1, wherein the electronic device is GPS enabled and wherein the relative location is further determined based GPS information determined by the electronic device.

10. The electronic device of claim 1, wherein the instructions, when executed, cause the electronic device to receive current relative location information without said electronic device and said at least one other electronic device physically overlapping.

11. The electronic device according to claim 1, wherein said electronic device is portable and communicates wirelessly with the imagine device.

12. The electronic device according to claim 1, wherein the instructions, when executed, cause the electronic device to communicate with the at least one other electronic device in a connected environment.

13. A system comprising:
an imaging system configured to monitor a relative location of an electronic devices and at least one other electronic device and to transmit information relating to the relative location of the electronic device and the at least one other electronic device, the imaging system located above the electronic device and the at least one other electronic device to monitor devices near a surface, the imaging system located in a device that is separate from the electronic device and the at least one other electronic device; and the electronic device configured to receive information indicating a current location of the electronic device relative to a location of the at least one other electronic device from the imaging device located in the device that is separate from the electronic device and the at least one other electronic device, wherein the imaging device is in the device that is separate from the electronic device and the at least one other electronic device, display on a display a representation of the electronic device and its relative location to the at least one other electronic device, and receive at an input interface of the electronic device a gesture in the direction of the at least one other electronic device, in response to the gesture, establish a communication session with the at least one other electronic device.

\* \* \* \* \*

UNITED STATES PATENT AND TRADEMARK OFFICE
CERTIFICATE OF CORRECTION

| | |
|---|---|
| PATENT NO. | : 9,161,166 B2 |
| APPLICATION NO. | : 13/404906 |
| DATED | : October 13, 2015 |
| INVENTOR(S) | : Karl-Anders Reinhold Johansson et al. |

Page 1 of 1

It is certified that error appears in the above-identified patent and that said Letters Patent is hereby corrected as shown below:

Claims

Column 26, Line 55, In Claim 11, delete "imagine" and insert -- imaging --, therefor.

Column 26, Line 62, In Claim 13, delete "devices" and insert -- device --, therefor.

Signed and Sealed this
Fifth Day of April, 2016

Michelle K. Lee
*Director of the United States Patent and Trademark Office*